(12) United States Patent
Schnittman

(10) Patent No.: US 9,020,637 B2
(45) Date of Patent: Apr. 28, 2015

(54) SIMULTANEOUS LOCALIZATION AND MAPPING FOR A MOBILE ROBOT

(71) Applicant: iRobot Corporation, Bedford, MA (US)

(72) Inventor: Mark Schnittman, Somerville, MA (US)

(73) Assignee: iRobot Corporation, Bedford, MA (US)

( * ) Notice: Subject to any disclaimer, the term of this patent is extended or adjusted under 35 U.S.C. 154(b) by 122 days.

(21) Appl. No.: 13/790,643

(22) Filed: Mar. 8, 2013

(65) Prior Publication Data
US 2014/0129027 A1    May 8, 2014

Related U.S. Application Data

(60) Provisional application No. 61/721,886, filed on Nov. 2, 2012.

(51) Int. Cl.
*G05D 1/00* (2006.01)
*G05D 1/02* (2006.01)

(52) U.S. Cl.
CPC ............ *G05D 1/0219* (2013.01); *G05D 1/0242* (2013.01); *G05D 1/0274* (2013.01); *G05D 1/0227* (2013.01); *G05D 1/0272* (2013.01); *G05D 2201/0203* (2013.01)

(58) Field of Classification Search
CPC .. G05D 1/0274; G05D 1/0227; G05D 1/0219
USPC .................. 700/253; 701/23, 25–26, 28, 448; 382/106, 113, 154, 181, 285
See application file for complete search history.

(56) References Cited

U.S. PATENT DOCUMENTS

| | | | |
|---|---|---|---|
| 4,628,453 A | 12/1986 | Kamejima et al. | |
| 4,942,539 A | 7/1990 | McGee et al. | |
| 4,954,962 A | 9/1990 | Evans et al. | |
| 5,040,116 A | 8/1991 | Evans et al. | |
| 5,109,425 A | 4/1992 | Lawton | |
| 5,111,401 A | 5/1992 | Everett, Jr. et al. | |
| 5,144,685 A | 9/1992 | Nasar et al. | |

(Continued)

OTHER PUBLICATIONS

Stella E. Circirelli et al., "Position Estimation for a Mobile Robot Using Data Fusion Intelligent Control," IEEE, May 1995, pp. 565-570.

(Continued)

*Primary Examiner* — Dalena Tran
(74) *Attorney, Agent, or Firm* — Honigman Miller Schwartz and Cohn LLP

(57) ABSTRACT

A method of simultaneous localization and mapping includes initializing a robot pose and a particle model of a particle filter. The particle model includes particles, each having an associated map, robot pose, and weight. The method includes receiving sparse sensor data from a sensor system of the robot, synchronizing the received sensor data with a change in robot pose, accumulating the synchronized sensor data over time, and determining a robot localization quality. When the accumulated sensor data exceeds a threshold accumulation and the robot localization quality is greater than a threshold localization quality, the method includes updating particles with accumulated synchronized sensor data. The method includes determining a weight for each updated particle of the particle model and setting a robot pose belief to the robot pose of the particle having the highest weight when a mean weight of the particles is greater than a threshold particle weight.

47 Claims, 16 Drawing Sheets

(56) References Cited

U.S. PATENT DOCUMENTS

| | | | |
|---|---|---|---|
| 5,155,775 A | 10/1992 | Brown | |
| 5,170,352 A | 12/1992 | McTamaney et al. | |
| 5,321,614 A | 6/1994 | Ashworth | |
| 5,517,419 A | 5/1996 | Lanckton et al. | |
| 5,525,882 A | 6/1996 | Asaka et al. | |
| 5,525,883 A | 6/1996 | Avitzour | |
| 5,581,629 A | 12/1996 | Hanna et al. | |
| 5,677,836 A | 10/1997 | Bauer | |
| 5,793,934 A | 8/1998 | Bauer | |
| 5,957,984 A | 9/1999 | Rencken | |
| 6,005,610 A | 12/1999 | Pingali | |
| 6,009,359 A | 12/1999 | El-Hakim et al. | |
| 6,243,657 B1 | 6/2001 | Tuck et al. | |
| 6,266,068 B1 | 7/2001 | Kang et al. | |
| 6,269,763 B1 | 8/2001 | Woodland | |
| 6,285,393 B1 | 9/2001 | Shimoura et al. | |
| 6,288,704 B1 | 9/2001 | Flack et al. | |
| 6,301,370 B1 | 10/2001 | Steffens et al. | |
| 6,389,329 B1 | 5/2002 | Colens | |
| 6,427,118 B1 | 7/2002 | Suzuki | |
| 6,459,955 B1 | 10/2002 | Bartsch et al. | |
| 6,496,754 B2 | 12/2002 | Song et al. | |
| 6,532,404 B2 | 3/2003 | Colens | |
| 6,552,729 B1 | 4/2003 | Di Bernardo et al. | |
| 6,594,844 B2 | 7/2003 | Jones | |
| 6,690,134 B1 | 2/2004 | Jones et al. | |
| 6,711,293 B1 | 3/2004 | Lowe | |
| 6,728,635 B2 | 4/2004 | Hamada et al. | |
| 6,771,932 B2 | 8/2004 | Caminiti | |
| 6,781,338 B2 | 8/2004 | Jones et al. | |
| 6,809,490 B2 | 10/2004 | Jones et al. | |
| 6,836,701 B2 | 12/2004 | McKee | |
| 6,898,518 B2 | 5/2005 | Padmanabhan | |
| 6,915,008 B2 | 7/2005 | Barman et al. | |
| 6,917,855 B2 | 7/2005 | Gonzalez-Banos | |
| 6,965,209 B2 | 11/2005 | Jones et al. | |
| 7,015,831 B2 | 3/2006 | Karlsson et al. | |
| 7,031,496 B2 | 4/2006 | Shimano et al. | |
| 7,082,350 B2 | 7/2006 | Skoog | |
| 7,135,992 B2 | 11/2006 | Karlsson et al. | |
| 7,145,478 B2* | 12/2006 | Goncalves et al. | 340/995.1 |
| 7,155,308 B2 | 12/2006 | Jones | |
| 7,162,338 B2 | 1/2007 | Goncalves et al. | |
| 7,173,391 B2 | 2/2007 | Jones et al. | |
| 7,177,737 B2 | 2/2007 | Karlsson et al. | |
| 7,196,487 B2 | 3/2007 | Jones et al. | |
| 7,272,467 B2 | 9/2007 | Goncalves et al. | |
| 7,388,343 B2 | 6/2008 | Jones et al. | |
| 7,389,156 B2 | 6/2008 | Ziegler et al. | |
| 7,448,113 B2 | 11/2008 | Jones et al. | |
| 7,571,511 B2 | 8/2009 | Jones et al. | |
| 7,636,982 B2 | 12/2009 | Jones et al. | |
| 7,689,321 B2 | 3/2010 | Karlsson et al. | |
| 7,761,954 B2 | 7/2010 | Ziegler et al. | |
| 7,774,158 B2* | 8/2010 | Goncalves et al. | 702/152 |
| 8,543,241 B2* | 9/2013 | Hong et al. | 700/259 |
| 2002/0016649 A1 | 2/2002 | Jones | |
| 2002/0120364 A1 | 8/2002 | Colens | |
| 2003/0007682 A1 | 1/2003 | Koshizen et al. | |
| 2003/0025472 A1 | 2/2003 | Jones et al. | |
| 2003/0030398 A1 | 2/2003 | Jacobs et al. | |
| 2003/0044048 A1 | 3/2003 | Zhang et al. | |
| 2004/0020000 A1 | 2/2004 | Jones | |
| 2004/0049877 A1 | 3/2004 | Jones et al. | |
| 2004/0167670 A1 | 8/2004 | Goncalves et al. | |
| 2004/0167688 A1 | 8/2004 | Karlsson et al. | |
| 2004/0167716 A1 | 8/2004 | Goncalves et al. | |
| 2004/0187457 A1 | 9/2004 | Colens | |
| 2004/0207355 A1 | 10/2004 | Jones et al. | |
| 2005/0067994 A1 | 3/2005 | Jones et al. | |
| 2005/0204717 A1 | 9/2005 | Colens | |
| 2005/0234679 A1 | 10/2005 | Karlsson et al. | |
| 2007/0090973 A1 | 4/2007 | Karlsson et al. | |
| 2007/0266508 A1 | 11/2007 | Jones et al. | |
| 2008/0140255 A1 | 6/2008 | Ziegler et al. | |
| 2008/0155768 A1 | 7/2008 | Ziegler et al. | |
| 2008/0307590 A1 | 12/2008 | Jones et al. | |
| 2010/0049365 A1 | 2/2010 | Jones et al. | |
| 2010/0257690 A1 | 10/2010 | Jones et al. | |
| 2010/0257691 A1 | 10/2010 | Jones et al. | |
| 2010/0263158 A1 | 10/2010 | Jones et al. | |
| 2014/0005933 A1* | 1/2014 | Fong et al. | 701/447 |
| 2014/0058610 A1* | 2/2014 | Sofman et al. | 701/23 |

OTHER PUBLICATIONS

G. Dissanayake et al., "A Computationally Efficient Solution to the Simultaneous Localization and Map Building (SLAM) Problem," Proceedings of the 2000 IEEE International Conference on Robotics & Automation (ICRA), Apr. 2000, pp. 1009-1014.

S.I. Roumeliotis et al., "Bayesian Estimation and Kalman Filtering: A Unified Framework for Mobile Robot Localization," Proceedings of the IEEE International Conference on Robotics and Automation (ICRA), San Francisco, CA, 2000, pp. 2985-2992.

Wolf J. Burgard et al., "Robust Vision-Based Localization for Mobile Robots Using an Image Retrieval System Based on Invariant Features," Proceeding of the 2002 IEEE International Conference on Robotics and Automation, Washington, D.C., May 2002, pp. 359-363.

S. Thrun, "Probabilistic Algorithms in Robotics," Technical Report, CMU-CS-00-126, Carnegie Mellon University, Pittsburgh, PA, Apr. 2000, pp. 1-18.

S. Thrun, "Robotic Mapping: A Survey," Technical Report, CMU-CS-02-111, Carnegie Mellon University, Pittsburgh, PA, Feb. 2000, pp. 1-29.

D. Fox et al., "Particle Filters for Mobile Robot Localization," New York, 2001, pp. 401-428.

D. Fox et al., "Markov Localization for Mobile Robots in Dynamic Environments," Journal of Artificial Intelligence Research, vol. 11, 1999, pp. 391-427.

David Lowe, "Object Recognition from Local Scale-Invariant Features," Proceedings of the International Conference on Computer Vision, Greece, Sep. 1999, pp. 1150-1157.

Olivier Faugeras et al., "Three Views: The Trifocal Geometry," The Geometry of Multiple Images, Cambridge, MA, The MIT Press, 2001, pp. 409-500.

R.E. Kalman, "A New Approach to Linear Filtering and Prediction Problems," Transaction of the ASME—Journal of Basic Engineering, vol. 82D, 1960, pp. 35-45.

D.G. Lowe, "Local Feature View Clustering for 3D Object Recognition," Proceedings of the IEEE Conference on Computer Vision and Pattern Recognition, Dec. 2001, pp. 682-688.

M. Montemerlo et al., "FastSLAM: A Factored Solution to the Simultaneous Localization and Mapping Problem," Proceedings of the American Association for Artificial Intelligence National Conference on Artificial Intelligence, Edmonton, Canada, 2002.

S. Se et al., "Local and Global Localization for Mobile Robots Using Visual Landmarks," Proceedings of the 2001 IEEE International Conference on Intelligent Robots and Systems, Hawaii, 2001, pp. 414-420.

S. Se et al., "Mobile Robot Localization and Mapping with Uncertainty Using Scale-Invariant Features," The International Journal of Robotics Research, vol. 21, No. 8, Aug. 2002, pp. 735-758.

S. Se et al., "Vision-Based Mobile Robot Localization and Mapping Using Scale-Invariant Features," Proceedings of IEEE International Conference on Robotics and Automation, Seoul, Korea, May 2001, pp. 2051-2058.

S. Thrun et al., "A Probabilistic Approach to Concurrent Mapping and Localization for Mobile Robots," Machine Learning, vol. 31, No. 1-3, pp. 29-53.

Gasper et al., "Vision-Based Navigation and Environmental Representation with an Omnidirectional Camera," 2000, IEEE, pp. 890-898.

Castellanos et al., "Multisensor Fusion for Simultaneous Localization and Map Building," 2001, IEEE, pp. 908-914.

Adam et al., "Fusion of Fixation and Odometry for Vehicle Navigation," 1999, IEEE, pp. 593-603.

* cited by examiner

SIMULTANEOUS LOCALIZATION AND MAPPING FOR A MOBILE ROBOT

CROSS REFERENCE TO RELATED APPLICATIONS

This U.S. patent application claims priority under 35 U.S.C. §119(e) to U.S. Provisional Application 61/721,886, filed on Nov. 2, 2012, which is hereby incorporated by reference in its entirety.

TECHNICAL FIELD

This disclosure relates to simultaneous localization and mapping (SLAM) for mobile robots.

BACKGROUND

A robot is generally an electro-mechanical machine guided by a computer or electronic programming. Mobile robots have the capability to move around in their environment and are not fixed to one physical location. An example of a mobile robot that is in common use today is an automated guided vehicle or automatic guided vehicle (AGV). An AGV is generally a mobile robot that follows markers or wires in the floor, or uses a vision system or lasers for navigation. Mobile robots can be found in industry, military and security environments. They also appear as consumer products, for entertainment or to perform certain tasks like vacuum cleaning and home assistance.

SUMMARY

One aspect of the disclosure provides a method of simultaneous localization and mapping executed on a controller of an autonomous mobile robot. The method includes initializing a robot pose and initializing a particle model of a particle filter executing on the controller. The particle model includes particles, each having an associated map, robot pose, and weight. The method also includes receiving sparse sensor data from a sensor system of the robot, synchronizing the received sensor data with a change in robot pose, accumulating the synchronized sensor data over time in non-transitory memory, and determining a localization quality of the robot. When the accumulated sensor data exceeds a threshold accumulation and the robot localization quality is greater than a threshold localization quality, the method includes updating particles of the particle model with accumulated synchronized sensor data. The method includes determining a weight for each updated particle of the particle model and setting a robot pose belief to the robot pose of the particle having the highest weight when a mean weight of the particles is greater than a threshold particle weight.

A computer program product encoded on a non-transitory computer readable storage medium may include instructions that when executed by a data processing apparatus cause the data processing apparatus to perform the method of simultaneous localization and mapping described above.

Implementations of the disclosure may include one or more of the following features. In some implementations, the method includes sampling the particle model for a particle population and resampling the particle model for the particle population when the robot localization quality is greater than the threshold localization quality. The method may include replacing a portion of the particle population with randomly selected particles of the particle model when resampling fails to occur within a threshold sampling time period. Additionally or alternatively, the method may include replacing a portion of the particle population with particles selected from the particle model based on the accumulated synchronized sensor data when resampling fails to occur within a threshold sampling time period.

The method may include determining the change in robot pose using odometry received from a drive system of the robot and inertial measurements from an inertial measurement unit of the robot. In some examples, determining the robot localization quality includes computing an instantaneous localization, receiving the instantaneous localization through a fast low-pass filter, receiving the instantaneous localization through a slow low-pass filter, and receiving the instantaneous localization through a leaky integrator. The method may include comparing a ratio of results of the two low-pass filters integrated by the integrator. When a result of the integrator is above a threshold value, the method may include determining the robot as well localized (e.g., by assigning a localization quality accordingly).

The sensor data may include range data (e.g., from one or more infrared range finding sensors) and the synchronized sensor data include range measurement and bearing pairs. The bearings may be determined from received odometry.

In some implementations, the method includes updating each particle's pose, map, and weight. Updating the particle pose may include applying a robot motion model to the accumulated synchronized sensor data. The robot motion model models movement of the robot based on odometry and inertial measurements. Updating the particle map may include executing a ray trace of the accumulated synchronized sensor data and applying a range sensor model to the accumulated synchronized sensor data. Updating the particle weight may be based on a number of measured ranges of the accumulated synchronized sensor data matching predicted ranges.

Executing the ray trace may include, for each range measurement and bearing pair, receiving the bearing and an existing particle map, and computing a predicted range. The method may further include receiving a measured range, receiving the predicted range, and computing a probability of occupancy of an object in each cell of the particle map along the ray trace. In some examples, applying the range sensor model includes only updating particle map cells corresponding to the synchronized sensor data.

In some implementations, applying the range sensor model includes computing a range error as an absolute difference between the measured range and the predicted range and computing the occupancy probability within each cell of the particle map along the ray trace based on the range error. For each particle map cell along the ray trace, the method may include computing a first occupancy probability assuming detection of an expected object, computing a second occupancy probability assuming detection of an expectedly close object, computing a third occupancy probability assuming failure to detect of an expected close object within a threshold distance of the robot, and computing a weighted average of the first, second, and third occupancy probabilities.

Another aspect of the disclosure provides an autonomous mobile robot that includes a drive system configured to maneuver the robot over a floor surface and a sensor system having at least one infrared range finding sensor producing range data of a scene about the robot. The robot also includes a controller in communication with the drive system and the sensor system. The controller executes a simultaneous localization and mapping method that includes initializing a robot pose and initializing a particle model of a particle filter executing on the controller. The particle model includes particles, each having an associated map, robot pose, and weight.

The method also includes receiving sparse sensor data from a sensor system of the robot, synchronizing the received sensor data with a change in robot pose, accumulating the synchronized sensor data over time in non-transitory memory, and determining a localization quality of the robot. When the accumulated sensor data exceeds a threshold accumulation and the robot localization quality is greater than a threshold localization quality, the method includes updating particles of the particle model with accumulated synchronized sensor data. The method includes determining a weight for each updated particle of the particle model and setting a robot pose belief to the robot pose of the particle having the highest weight when a mean weight of the particles is greater than a threshold particle weight.

In some implementations, the method includes sampling the particle model for a particle population and resampling the particle model for the particle population when the robot localization quality is greater than the threshold localization quality. The method may include replacing a portion of the particle population with randomly selected particles of the particle model when resampling fails to occur within a threshold sampling time period. Additionally or alternatively, the method may include replacing a portion of the particle population with particles selected from the particle model based on the accumulated synchronized sensor data when resampling fails to occur within a threshold sampling time period.

The method may include determining the change in robot pose using odometry received from a drive system of the robot and inertial measurements from an inertial measurement unit of the robot. In some examples, determining the robot localization quality includes computing an instantaneous localization, receiving the instantaneous localization through a fast low-pass filter, receiving the instantaneous localization through a slow low-pass filter, and receiving the instantaneous localization through a leaky integrator. The method may include comparing a ratio of results of the two low-pass filters integrated by the integrator. When a result of the integrator is above a threshold value, the method may include determining the robot as well localized (e.g., by assigning a localization quality accordingly).

The sensor data may include range data (e.g., from one or more infrared range finding sensors) and the synchronized sensor data include range measurement and bearing pairs. The bearings may be determined from received odometry.

In some implementations, the method includes updating each particle's pose, map, and weight. Updating the particle pose may include applying a robot motion model to the accumulated synchronized sensor data. The robot motion model models movement of the robot based on odometry and inertial measurements. Updating the particle map may include executing a ray trace of the accumulated synchronized sensor data and applying a range sensor model to the accumulated synchronized sensor data. Updating the particle weight may be based on a number of measured ranges of the accumulated synchronized sensor data matching predicted ranges.

Executing the ray trace may include, for each range measurement and bearing pair, receiving the bearing and an existing particle map, and computing a predicted range. The method may further include receiving a measured range, receiving the predicted range, and computing a probability of occupancy of an object in each cell of the particle map along the ray trace. In some examples, applying the range sensor model includes only updating particle map cells corresponding to the synchronized sensor data.

In some implementations, applying the range sensor model includes computing a range error as an absolute difference between the measured range and the predicted range and computing the occupancy probability within each cell of the particle map along the ray trace based on the range error. For each particle map cell along the ray trace, the method may include computing a first occupancy probability assuming detection of an expected object, computing a second occupancy probability assuming detection of an expectedly close object, computing a third occupancy probability assuming failure to detect of an expected close object within a threshold distance of the robot, and computing a weighted average of the first, second, and third occupancy probabilities.

Another aspect of the disclosure provides a method executed on a controller of an autonomous mobile robot. The method includes determining a localization quality of the robot and when the localization quality is below a threshold quality, accessing a good particle from a particle model of a particle filter executing on the controller. The particle model has particles, each having an associated map, robot pose, and weight. The good particle has weight greater than a threshold weight. The method includes generating new particles based on the last known good particle and re-populating at least a portion of the particle model with the new particles.

In some implementations, accessing a good particle includes accessing a last known good particle. The method may include ceasing map building when the localization quality is below the threshold quality. Determining the robot localization quality may include computing an instantaneous localization, receiving the instantaneous localization through a fast low-pass filter, receiving the instantaneous localization through a slow low-pass filter, and receiving the instantaneous localization through a leaky integrator.

The method may include initializing a robot pose and initializing the particle model of the particle filter executing on the controller. The method may also include receiving sparse sensor data from a sensor system of the robot, synchronizing the received sensor data with a change in robot pose, accumulating the synchronized sensor data over time in non-transitory memory, and determining a localization quality of the robot. When the accumulated sensor data exceeds a threshold accumulation and the robot localization quality is greater than a threshold localization quality, the method may include updating particles of the particle model with accumulated synchronized sensor data. The method may include determining a weight for each updated particle of the particle model and setting a robot pose belief to the robot pose of the particle having the highest weight when a mean weight of the particles is greater than a threshold particle weight.

In some implementations, the method includes sampling the particle model for a particle population and resampling the particle model for the particle population when the robot localization quality is greater than the threshold localization quality. The method may include replacing a portion of the particle population with randomly selected particles of the particle model when resampling fails to occur within a threshold sampling time period. Additionally or alternatively, the method may include replacing a portion of the particle population with particles selected from the particle model based on the accumulated synchronized sensor data when resampling fails to occur within a threshold sampling time period.

The sensor data may include range data (e.g., from one or more infrared range finding sensors) and the synchronized sensor data include range measurement and bearing pairs. The bearings may be determined from received odometry.

In some implementations, the method includes updating each particle's pose, map, and weight. Updating the particle pose may include applying a robot motion model to the accumulated synchronized sensor data. The robot motion model models movement of the robot based on odometry and inertial measurements. Updating the particle map may include executing a ray trace of the accumulated synchronized sensor data and applying a range sensor model to the accumulated synchronized sensor data. Updating the particle weight may be based on a number of measured ranges of the accumulated synchronized sensor data matching predicted ranges.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

An autonomous robot movably supported may execute simultaneous localization and mapping (SLAM) on a controller to navigate and negotiate obstacles. For example, an autonomous cleaning robot may execute a SLAM routine navigate a cleaning area and to clean a surface while traversing that area.

Figure 1:
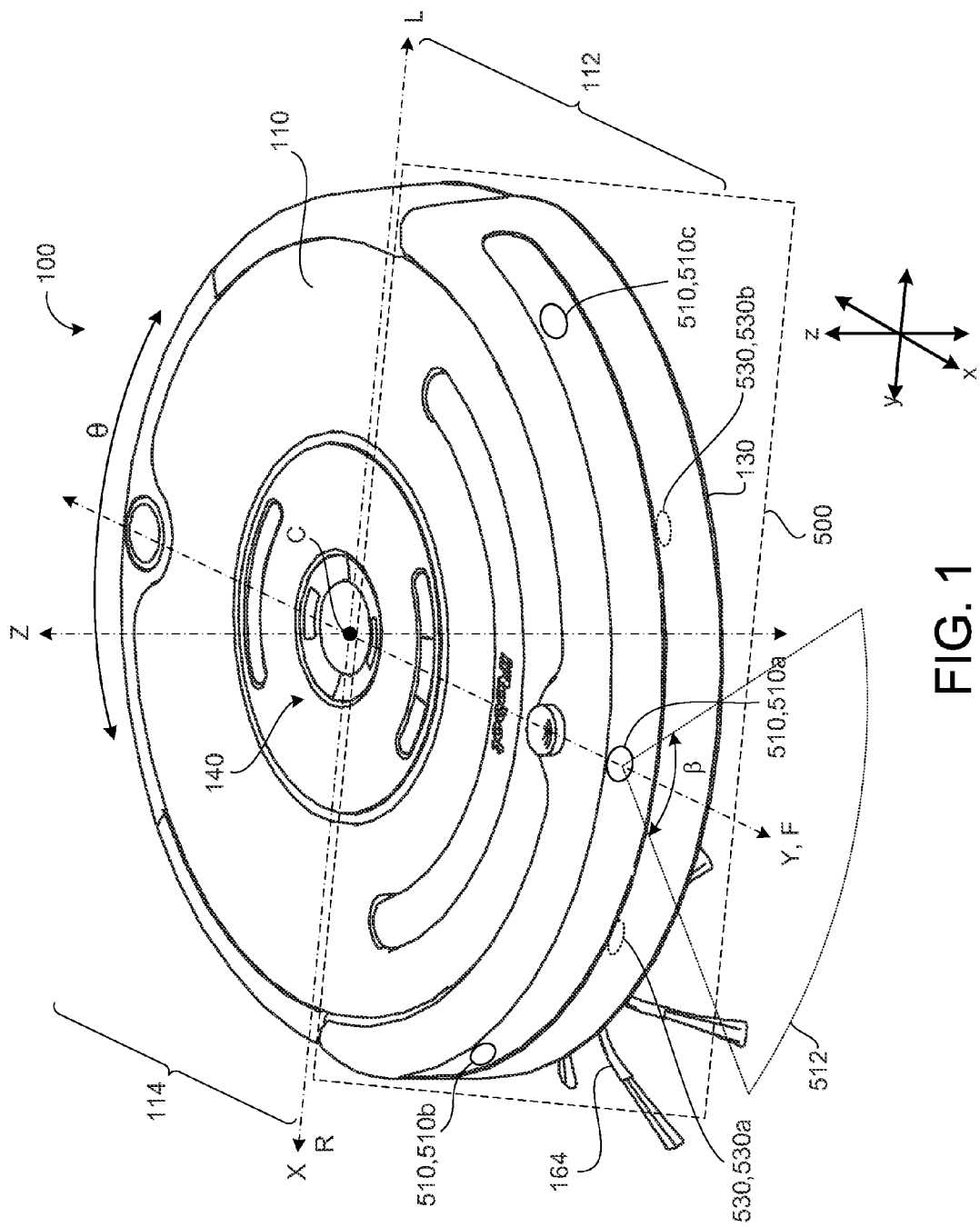
FIG. 1 is a front, top perspective view of an exemplary mobile robot.
Figure 2:
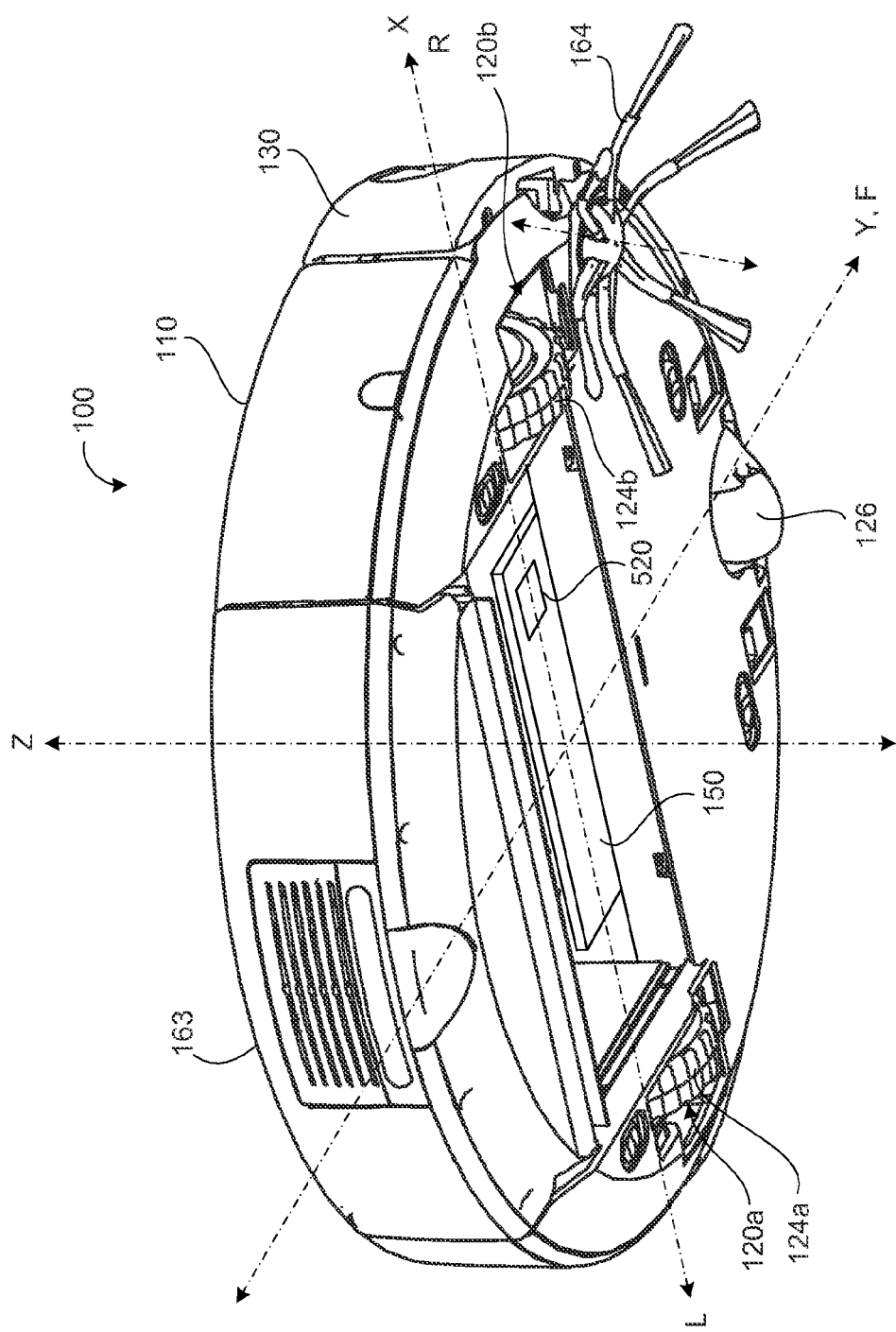
FIG. 2 is a bottom, rear perspective view of the mobile robot shown in FIG. 1.
Figure 3:
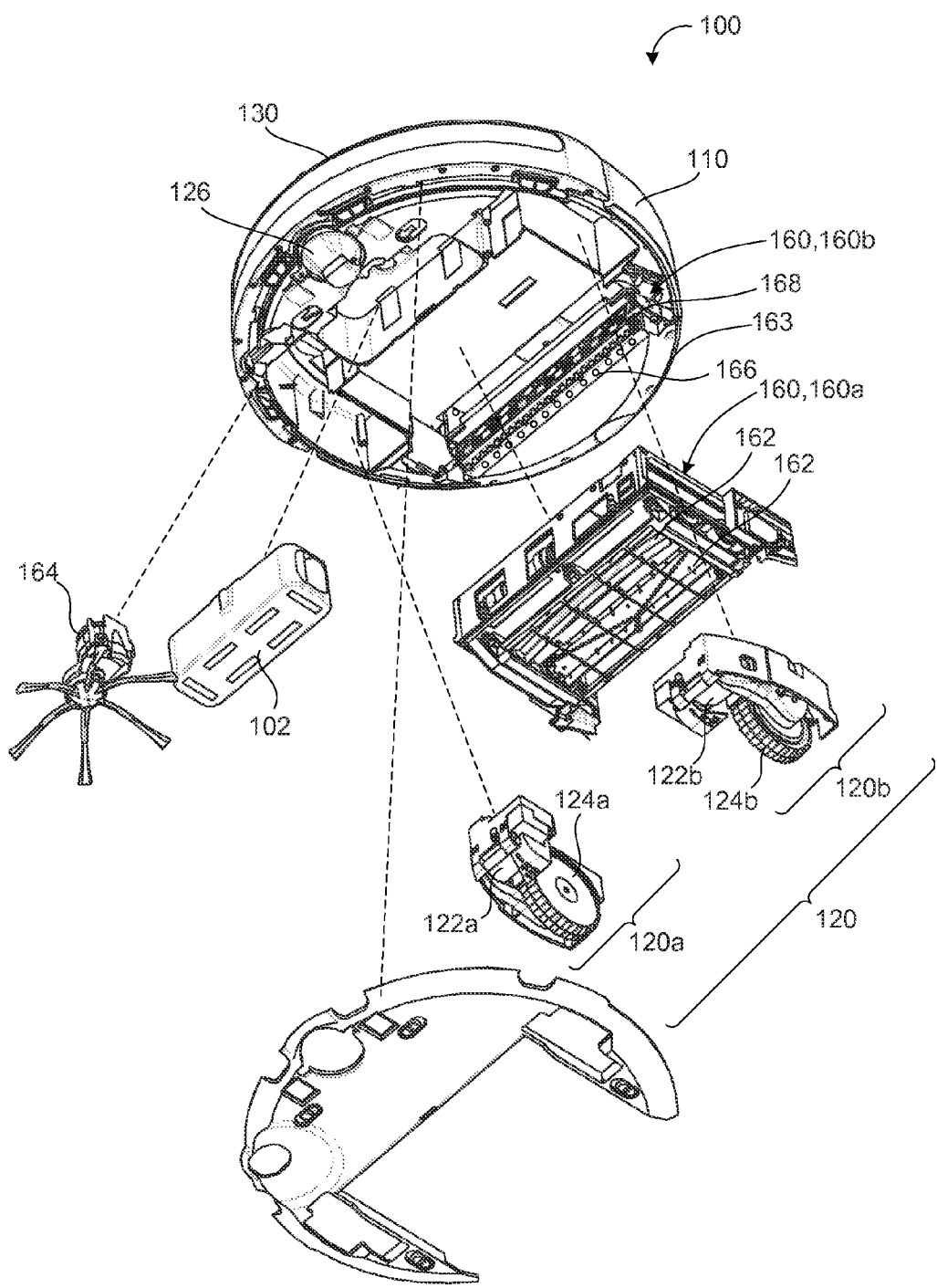
FIG. 3 is a partial exploded perspective view of the mobile robot shown in FIG. 1.

Referring to FIGS. 1-3, in some implementations, a robot 100 includes a body 110 supported by a drive system 120 that can maneuver the robot 100 across the floor surface 10 based on a drive command having x, y, and θ components, for example, issued by a controller 150. The robot body 110 has a forward portion 112 and a rearward portion 114. The drive system 120 includes right and left driven wheel modules 120a, 120b that may provide odometry to the controller 150.

The wheel modules 120a, 120b are substantially opposed along a transverse axis X defined by the body 110 and include respective drive motors 122a, 122b driving respective wheels 124a, 124b. The drive motors 122a, 122b may releasably connect to the body 110 (e.g., via fasteners or tool-less connections) with the drive motors 122a, 122b optionally positioned substantially over the respective wheels 124a, 124b. The wheel modules 120a, 120b can be releasably attached to the chassis 110 and forced into engagement with the cleaning surface 10 by respective springs. The robot 100 may include a caster wheel 126 disposed to support a forward portion 112 of the robot body 110. The robot body 110 supports a power source 102 (e.g., a battery) for powering any electrical components of the robot 100.

The robot 100 can move across the cleaning surface 10 through various combinations of movements relative to three mutually perpendicular axes defined by the body 110: a transverse axis X, a fore-aft axis Y, and a central vertical axis Z. A forward drive direction along the fore-aft axis Y is designated F (sometimes referred to hereinafter as "forward"), and an aft drive direction along the fore-aft axis Y is designated A (sometimes referred to hereinafter as "rearward"). The transverse axis X extends between a right side R and a left side L of the robot 100 substantially along an axis defined by center points of the wheel modules 120a, 120b.

A forward portion 112 of the body 110 carries a bumper 130, which detects (e.g., via one or more sensors) one or more events in a drive path of the robot 100, for example, as the wheel modules 120a, 120b propel the robot 100 across the cleaning surface 10 during a cleaning routine. The robot 100 may respond to events (e.g., obstacles, cliffs, walls) detected by the bumper 130 by controlling the wheel modules 120a, 120b to maneuver the robot 100 in response to the event (e.g., away from an obstacle). While some sensors are described herein as being arranged on the bumper, these sensors can additionally or alternatively be arranged at any of various different positions on the robot 100.

A user interface 140 disposed on a top portion of the body 110 receives one or more user commands and/or displays a status of the robot 100. The user interface 140 is in communication with the robot controller 150 carried by the robot 100 such that one or more commands received by the user interface 140 can initiate execution of a cleaning routine by the robot 100.

The robot controller 150 (executing a control system) may execute behaviors 300 (FIG. 7) that cause the robot 100 to take an action, such as maneuvering in a wall following manner, a floor scrubbing manner, or changing its direction of travel when an obstacle is detected. The robot controller 150 can maneuver the robot 100 in any direction across the cleaning surface 10 by independently controlling the rotational speed and direction of each wheel module 120a, 120b. For example, the robot controller 150 can maneuver the robot 100 in the forward F, reverse (aft) A, right R, and left L directions. As the robot 100 moves substantially along the fore-aft axis Y, the robot 100 can make repeated alternating right and left turns such that the robot 100 rotates back and forth around the center vertical axis Z (hereinafter referred to as a wiggle motion). The wiggle motion can allow the robot 100 to operate as a scrubber during cleaning operation. Moreover, the wiggle motion can be used by the robot controller 150 to detect robot stasis. Additionally or alternatively, the robot controller 150 can maneuver the robot 100 to rotate substantially in place such that the robot 100 can maneuver out of a corner or away from an obstacle, for example. The robot controller 150 may direct the robot 100 over a substantially random (e.g., pseudo-random) path while traversing the cleaning surface 10. The robot controller 150 can be responsive to one or more sensors (e.g., bump, proximity, wall, stasis, and cliff sensors) disposed about the robot 100. The robot controller 150 can redirect the wheel modules 120a, 120b in response to signals received from the sensors, causing the robot 100 to avoid obstacles and clutter while treating the cleaning surface 10. If the robot 100 becomes stuck or entangled during use, the robot controller 150 may direct the wheel modules 120a, 120b through a series of escape behaviors so that the robot 100 can escape and resume normal cleaning operations.

The robot 100 may include a cleaning system 160 for cleaning or treating the floor surface 10. The cleaning system 160 may include a dry cleaning system 160a and/or a wet cleaning system 160b. The dry cleaning system 160 may include a driven roller brush 162 (e.g., with bristles and/or beater flaps) extending parallel to the transverse axis X and rotatably supported by the robot body 110 to contact the floor surface 10. The driven roller brush agitates debris off of the floor surface 10 and throws or guides the agitated debris into a collection bin 163. The dry cleaning system 160 may also include a side brush 164 having an axis of rotation at an angle with respect to the floor surface 10 for moving debris into a cleaning swath area of the cleaning system 160. The wet cleaning system 160b may include a fluid applicator 166 that extends along the transverse axis X and dispenses cleaning liquid onto the surface 10. The dry and/or wet cleaning systems 160a, 160b may include one or more squeegee vacuums 168 (e.g., spaced apart compliant blades have a partial vacuum applied therebetween via an air pump) vacuuming the cleaning surface 10.

To achieve reliable and robust autonomous movement, the robot 100 may include a sensor system 500 having several different types of sensors which can be used in conjunction with one another to create a perception of the robot's environment sufficient to allow the robot 100 to make intelligent decisions about actions to take in that environment. The sensor system 500 may include one or more types of sensors supported by the robot body 110, which may include obstacle detection obstacle avoidance (ODOA) sensors, communication sensors, navigation sensors, etc. For example, these sensors may include, but not limited to, range finding sensors, proximity sensors, contact sensors, a camera (e.g., volumetric point cloud imaging, three-dimensional (3D) imaging or depth map sensors, visible light camera and/or infrared camera), sonar, radar, LIDAR (Light Detection And Ranging, which can entail optical remote sensing that measures properties of scattered light to find range and/or other information of a distant target), LADAR (Laser Detection and Ranging), etc. In some implementations, the sensor system 500 includes ranging sonar sensors, proximity cliff detectors, contact sensors, a laser scanner, and/or an imaging sonar.

There are several challenges involved in placing sensors on a robotic platform. First, the sensors need to be placed such that they have maximum coverage of areas of interest around the robot 100. Second, the sensors may need to be placed in such a way that the robot 100 itself causes an absolute minimum of occlusion to the sensors; in essence, the sensors cannot be placed such that they are "blinded" by the robot itself. Third, the placement and mounting of the sensors should not be intrusive to the rest of the industrial design of the platform. In terms of aesthetics, it can be assumed that a robot with sensors mounted inconspicuously is more "attractive" than otherwise. In terms of utility, sensors should be mounted in a manner so as not to interfere with normal robot operation (snagging on obstacles, etc.).

Figure 4A:
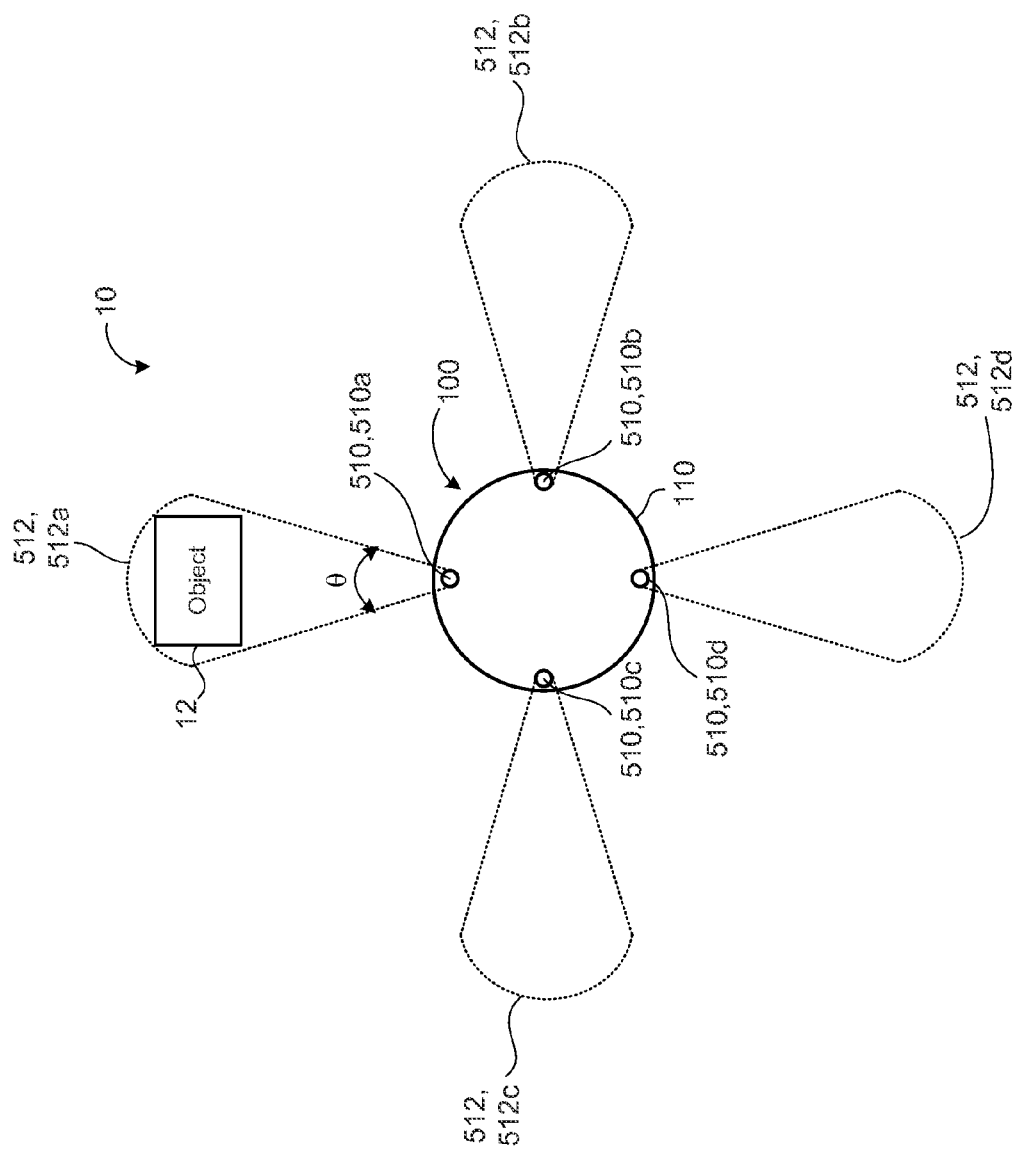
FIG. 4A is a schematic view of an exemplary mobile robot having four infrared range finding sensors.

Referring to FIGS. 1 and 4A, in some implementations, the sensor system 500 includes one or more range finding sensors 510 disposed on the robot body 110 or bumper 130. In the example shown in FIG. 1, the sensor system 500 includes three range finders 510a-c disposed on the bumper 130 and arranged with a field of view 512 substantially normal to the robot body 110 (e.g., radially outward). One range finder 510a may have its field of view 512 centered along the forward drive direction F. The field of view 512 may have an angle β of between about 5° and about 45°. Moreover, one or more of the range finders 510a-c may scan side-to-side and/or up-and-down with respect to the forward drive direction F to increase a lateral and vertical field of view 512 of the respective range finder 510. In the example shown, the sensor system 500 includes first, second, third, and fourth range finders 510a-d disposed on the robot body 110 and arranged equilaterally with respect to each other (e.g., spaced every 90 degrees about the round robot body 110). The four range finders 510a-d may be arranged as forward (i.e., directed along the forward drive direction F), right, left, and rearward (opposite of forward drive direction F) sensors. Other arrangements are possible as well, such just one range finder 510 (e.g., with the use of odometry) or many range finders disposed around the robot body 110. The range finders 510a-d can detect a distance to objects 12 in a scene 10 about the robot and in the field of view 512 of the range finders 510a-d.

The infrared range finders 510a-d offer a relatively low-cost, small package solution compared to a rotating scanner that may require mounting on top of the robot 100. A top mounted upwardly protruding scanning sensor (to obtain the 360 degree rotating field of view) may become a problem for obstacle avoidance. For example, such a sensor can cause wedging problems when the robot 100 attempts to pass under an obstacle.

Figure 4B:
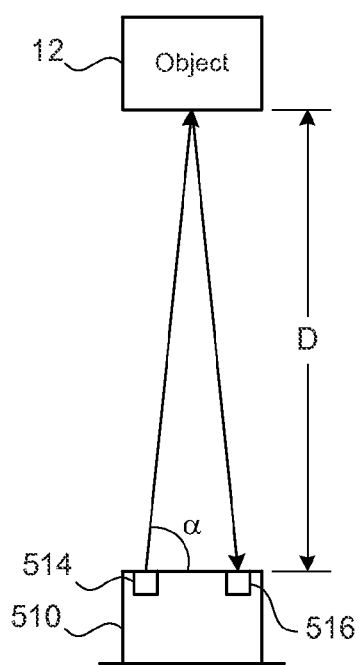
FIGS. 4B and 4C are schematic views of an exemplary infrared range finding sensor detecting an object.
Figure 4C:
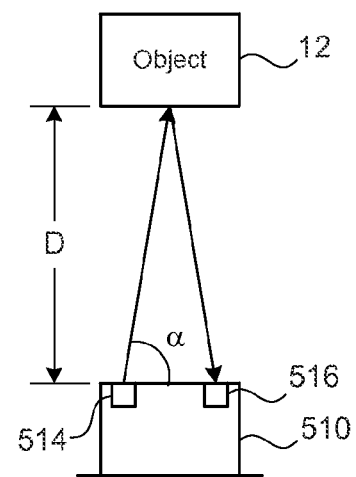

Referring to FIGS. 4B and 4C, the range finder 510 may be an infrared range finding sensor that employs triangulation. The range finder 510 includes an emitter 514 that emits a pulse of light (e.g., wavelength range of 850 nm+/−70 nm) and a detector 516 that detects a reflection back (or no reflection at all). When the emitted light reflects off of a surface of an object 12, the reflected light returns at an angle α dependent on a distance D of the reflecting object 12. By detecting the reflected beam angle α, the sensor system 500 can determine the distance D to the reflecting object 12. In some examples, the detector 516 has a precision lens that transmits the received reflected light onto an enclosed linear CCD (charge coupled device) array based on the triangulation angle α. The CCD array may determine the angle α and provide a corresponding analog value. The range finder 510 may apply a modulated frequency to the emitted IR beam, which can make the range detecting immune to interference from ambient light. In other words, the range finder 510 may be capable of detecting a wall in full sunlight.

The bumper 130 may include one or more bump sensors 530 (e.g., contact sensor, switch, or infrared proximity sensor) for sensing contact with a bumped object. In some examples, the bumper 130 includes right and left bump sensors 530a, 530b for sensing a directionality of the bump with respect to the forward drive direction (e.g., a bump vector).

Figure 5:
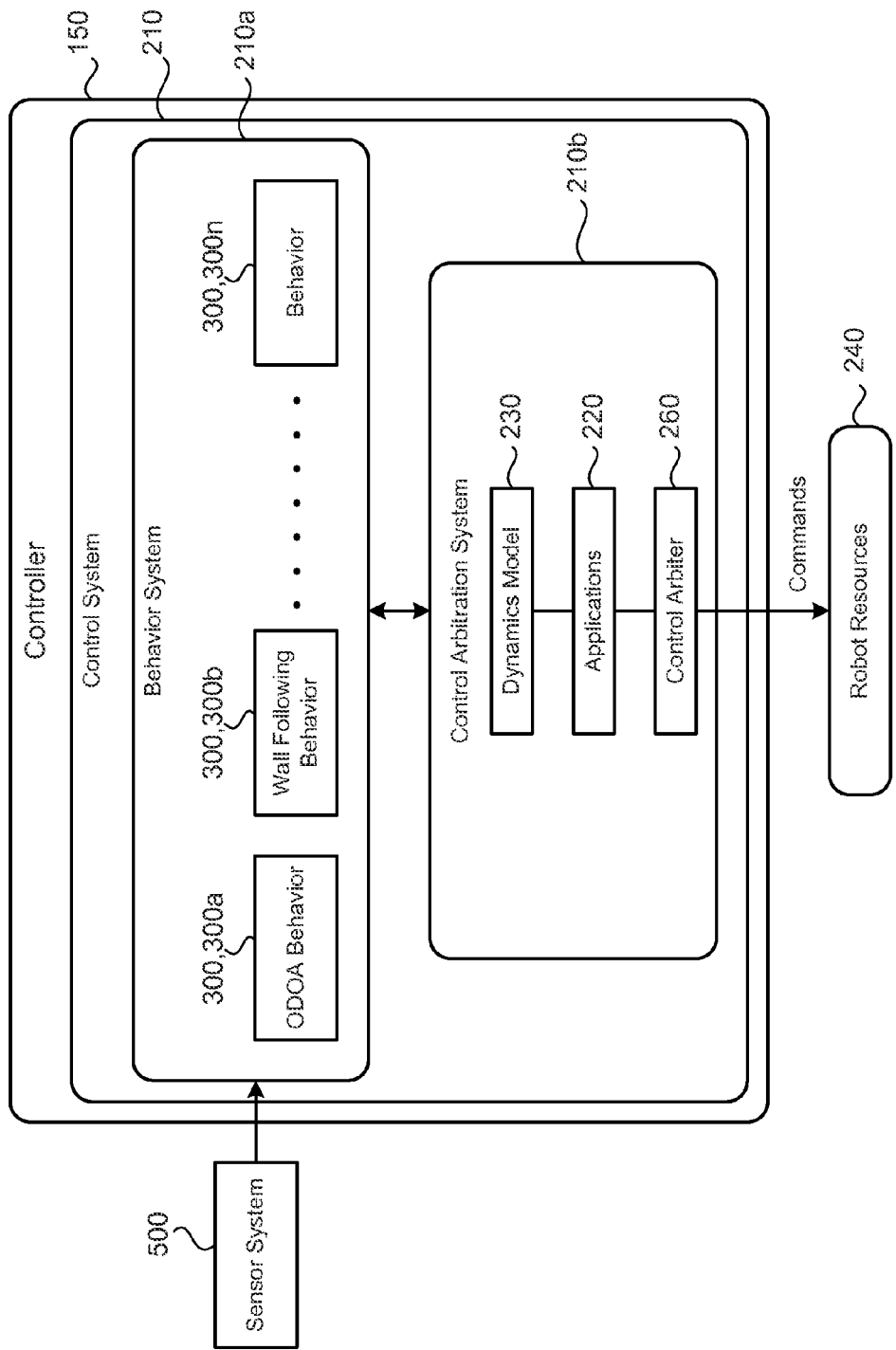
FIG. 5 is a schematic view of an exemplary controller for a mobile robot.
Figure 6:
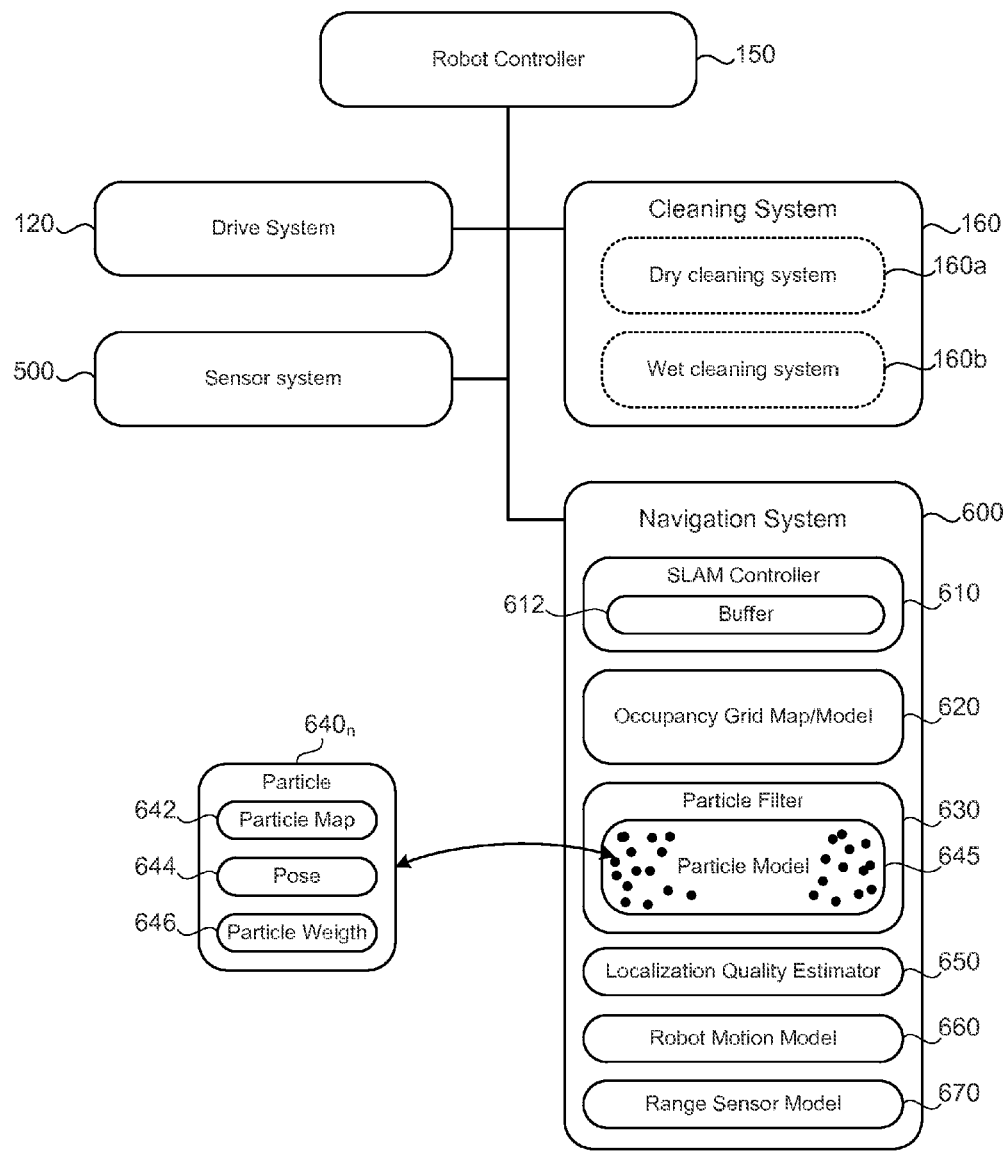
FIG. 6 is a schematic view of an exemplary mobile robot having a navigation system.

Referring to FIGS. 5 and 6, in some implementations, reasoning or control software, executable on the controller 150 (e.g., on a computing processor), uses a combination of algorithms executed using various data types generated by the sensor system 500. The reasoning software processes the data collected from the sensor system 500 and outputs data for making navigational decisions on where the robot 100 can move without colliding with an obstacle, for example.

To operate autonomously, the robot 100 may use a navigation system 600 to simultaneously localize and map its surroundings, using sensory inputs from the sensor system 500. Simultaneous localization and mapping (SLAM) is a technique the robot 100 may use to build up a map 620 (e.g., an occupancy map) within an unknown environment or scene 10 (without a-priori knowledge), or to update the map 620 within a known environment (with a-priori knowledge from a given map), while at the same time keeping track of its current location. The navigation system 600 allows the robot 100 to navigate a scene 10 without colliding into obstacles 12 or falling down stairs. The navigation system 600 may be a behavior based system stored and/or executed on the robot controller 150. Moreover, the navigation system 600 may communicate with the drive system 120 and the sensor system 500 to receive odometry and sensor data, such as gyroscopic data from an inertial measurement unit 520 and/or range data 515, to determine and issue drive commands to the drive system 120.

Odometry is the use of sensor data to estimate change in position over time (distance traveled). In some examples, an encoder is disposed on the drive system 200 for measuring wheel revolutions, therefore a distance traveled by the robot 100. The controller 150 may use odometry in assessing a confidence level for a robot location. In some implementations, the sensor system 500 includes an odometer and/or an angular rate sensor (e.g., gyroscope or the IMU 520) for sensing a distance traveled by the robot 100. A gyroscope is a device that can be used for measuring and/or maintaining orientation, based on the principles of conservation of angular momentum. The controller 150 may use odometry and/or gym signals received from the odometer and/or angular rate sensor, respectively, to determine a location of the robot 100 in a working floor area 5. In some examples, the controller 150 uses dead reckoning. Dead reckoning is the process of estimating a current position based upon a previously determined position, and advancing that position based upon known or estimated speeds over elapsed time, and course. By knowing a robot location in the working area 5 (e.g., via odometry, gyroscope, etc.) as well as a sensed location of one or more objects 12 in the working area 5 (via the sensor system 500), the controller 150 can assess a relatively higher confidence level of a location or movement of the robot 100 on an occupancy map 620 and in the working area 5 (versus without the use of odometry or a gyroscope).

Referring to FIG. 5, in some implementations, the controller 150 (e.g., a device having one or more computing processors in communication with memory capable of storing instructions executable on the computing processor(s)) executes a control system 210, which includes a behavior system 210*a* and a control arbitration system 210*b* in communication with each other. The control arbitration system 210*b* allows robot applications 220 to be dynamically added and removed from the control system 210, and facilitates allowing applications 220 to each control the robot 100 without needing to know about any other applications 220. In other words, the control arbitration system 210*b* provides a simple prioritized control mechanism between applications 220 and resources 240 of the robot 100.

The applications 220 can be stored in memory of or communicated to the robot 100, to run concurrently on (e.g., on a processor) and simultaneously control the robot 100. The applications 220 may access behaviors 300 of the behavior system 210*a*. The independently deployed applications 220 are combined dynamically at runtime and to share robot resources 240 (e.g., drive system 120 and/or cleaning systems 160, 160*a*, 160*b*). A low-level policy is implemented for dynamically sharing the robot resources 240 among the applications 220 at run-time. The policy determines which application 220 has control of the robot resources 240 as required by that application 220 (e.g. a priority hierarchy among the applications 220). Applications 220 can start and stop dynamically and run completely independently of each other. The control system 210 also allows for complex behaviors 300, 300*a-n* which can be combined together to assist each other.

The control arbitration system 210*b* includes one or more application(s) 220 in communication with a control arbiter 260. The control arbitration system 210*b* may include components that provide an interface to the control arbitration system 210*b* for the applications 220. Such components may abstract and encapsulate away the complexities of authentication, distributed resource control arbiters, command buffering, coordinate the prioritization of the applications 220 and the like. The control arbiter 260 receives commands from every application 220 generates a single command based on the applications' priorities and publishes it for its associated resources 240. The control arbiter 260 receives state feedback from its associated resources 240 and may send it back up to the applications 220. The robot resources 240 may be a network of functional modules (e.g., actuators, drive systems, and groups thereof) with one or more hardware controllers. The commands of the control arbiter 260 are specific to the resource 240 to carry out specific actions. A dynamics model 230 executable on the controller 150 is configured to compute the center for gravity (CG), moments of inertia, and cross products of inertial of various portions of the robot 100 for the assessing a current robot state.

In some implementations, a behavior 300 is a plug-in component that provides a hierarchical, state-full evaluation function that couples sensory feedback from multiple sources, such as the sensor system 500, with a-priori limits and information into evaluation feedback on the allowable actions of the robot 100. Since the behaviors 300 are pluggable into the application 220 (e.g. residing inside or outside of the application 220), they can be removed and added without having to modify the application 220 or any other part of the control system 210. Each behavior 300 is a standalone policy. To make behaviors 300 more powerful, it is possible to attach the output of multiple behaviors 300 together into the input of another so that you can have complex combination functions. The behaviors 300 are intended to implement manageable portions of the total cognizance of the robot 100.

In the example shown, the behavior system 210*a* includes an obstacle detection/obstacle avoidance (ODOA) behavior 300*a* for determining responsive robot actions based on obstacles perceived by the sensor (e.g., turn away; turn around; stop before the obstacle, etc.). Another behavior 300 may include a wall following behavior 300*b* for driving adjacent to a detected wall (e.g., in a wiggle pattern of driving toward and away from the wall).

Figure 7:
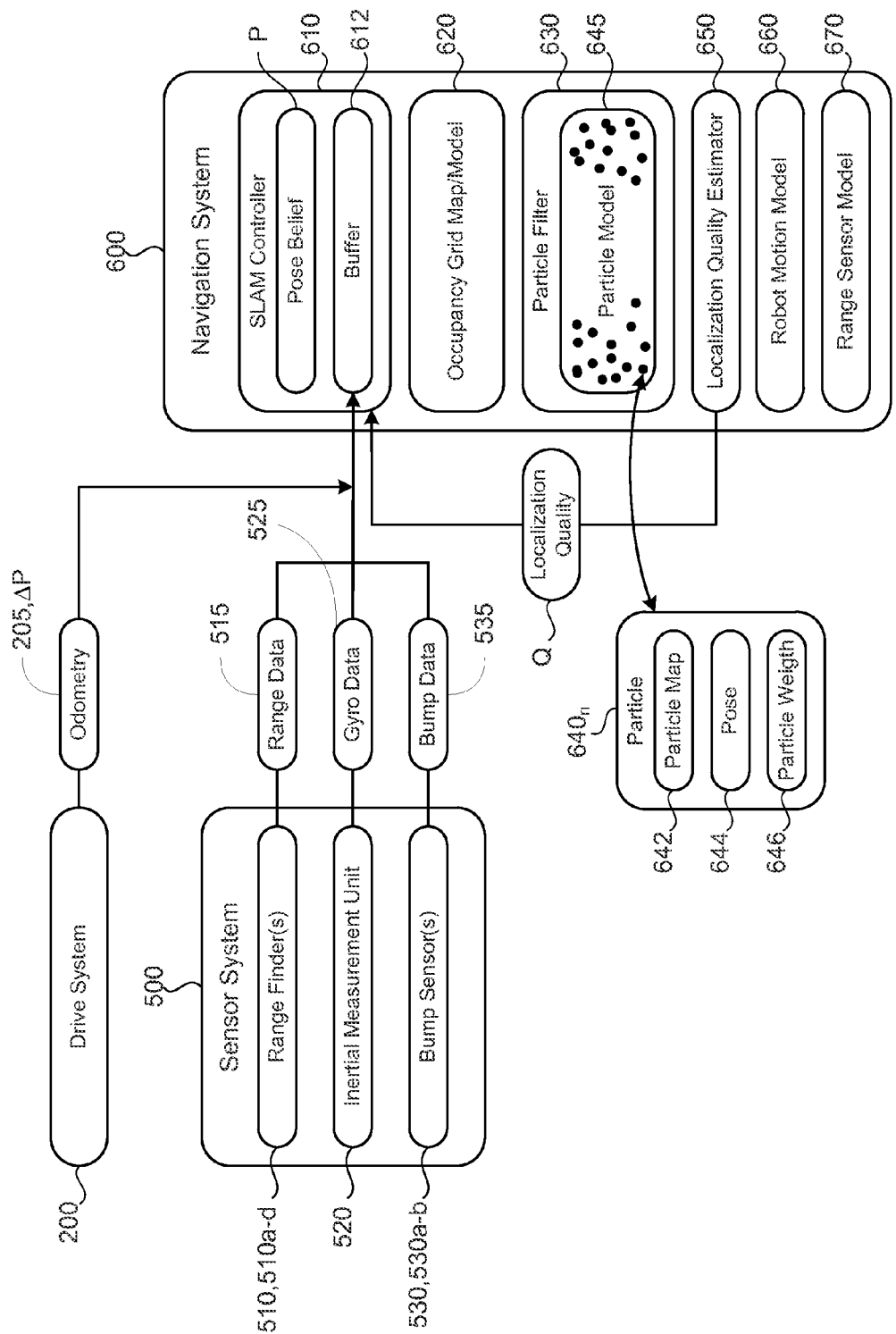
FIG. 7 is a schematic view of an exemplary navigation system for mobile robot.

Referring to FIGS. 6 and 7, in some implementations, the navigation system 600 includes a simultaneous localization and mapping (SLAM) controller 610, executable on a computing processor (e.g., on the robot controller 150), that builds maps 620 (e.g., feature based maps, occupancy maps and/or ground plane maps) using sensor data received from the sensor system 500. In some examples, the SLAM controller 610 relies on range data 515 (points) received from the range finders 510*a-d*, gyroscopic data 525 received from the inertial measurement unit 520, bump data 535 received from the bump sensor(s) 530, 503a-b, and/or odometry 205 received from the drive system 200.

Maps 620 can be used to determine a location within a scene or environment 10 and to depict an environment for planning and navigation. The maps 620 support the assessment of actual location by recording information obtained from a form of perception and comparing it to a current set of perceptions. The benefit of a map 620 in aiding the assessment of a location increases as the precision and quality of the current perceptions decrease. Maps 620 generally represent the state at the time that the map 620 is provided or produced. This is not necessarily consistent with the state of the environment at the time the map 620 is used. Other localization techniques include monocular visual SLAM (MonoSLAM) and implementations using an extended Kalman filter (EKF) for MonoSLAM solutions.

Figure 8A:
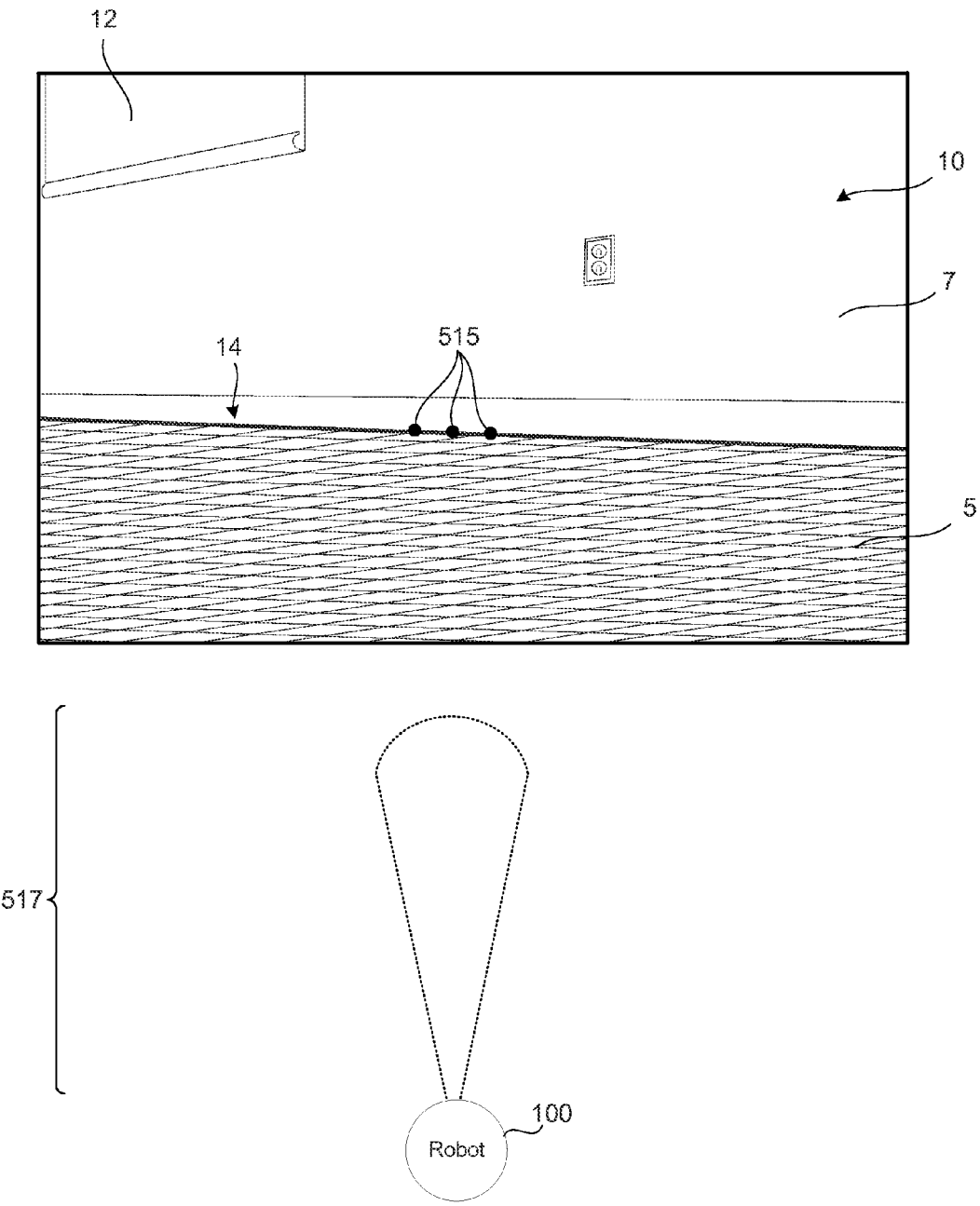
FIG. 8A is schematic view of an exemplary robot scanning its environment to obtain range data.
Figure 8B:
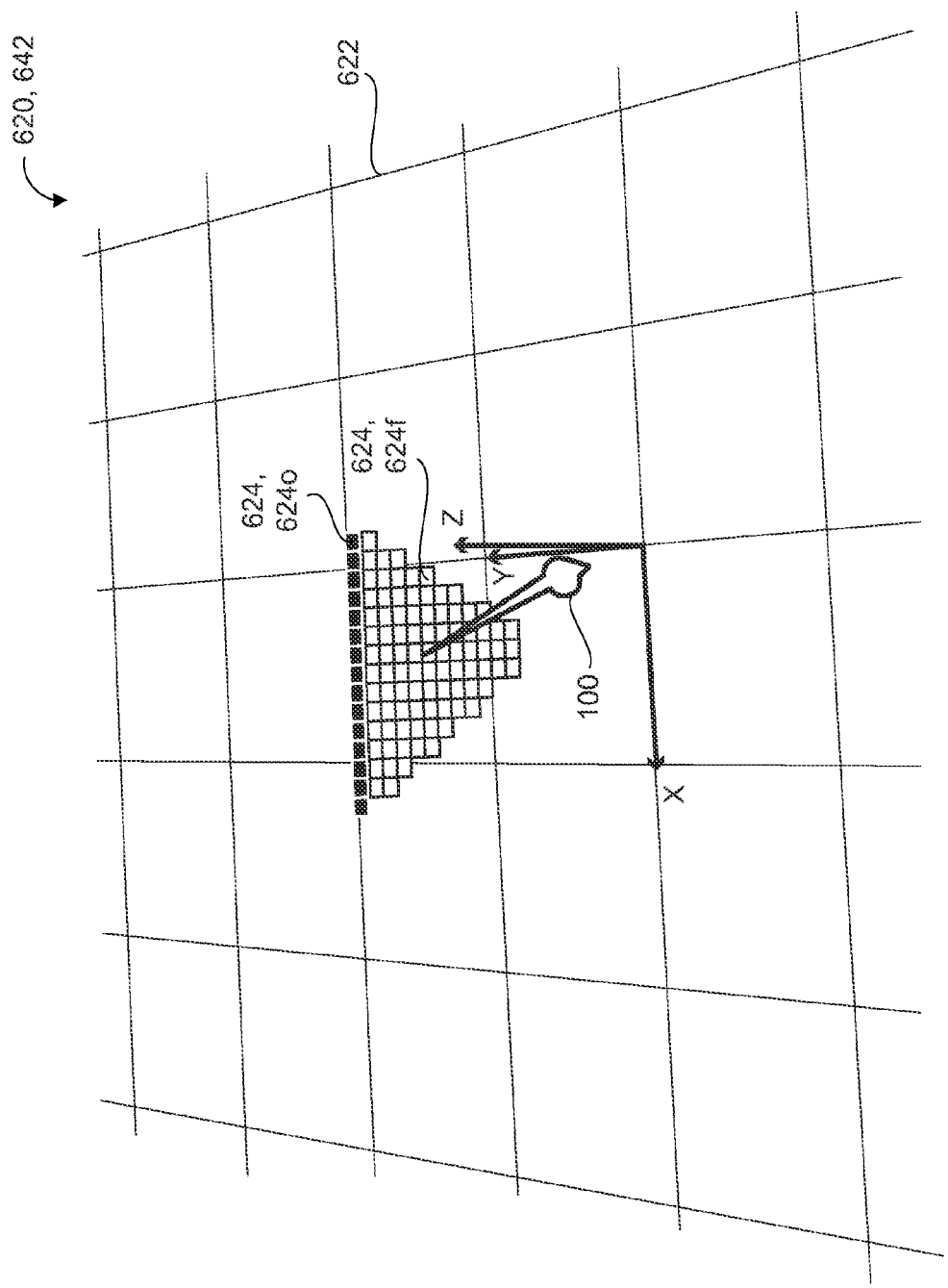
FIG. 8B is schematic view of an exemplary occupancy grid map.

FIG. 8A illustrates the robot 100 scanning its environment, a scene 10, to obtain range data 515. In this case, a range scan 517 detects a wall 7 intersecting the floor 5 in the scene 10, demarcating a trackable feature 14. FIG. 8B illustrates an exemplary occupancy grid map 620, which may be a 2D-XY grid 622 having cells 624 along an X direction and a Y direction. Each cell 624 of the occupancy grid map 620 contains a probability of occupancy based on the accumulation of range finder data resulting from the existence of an object 12 falling within that cell 624. In some examples, each cell 624 has a fixed size, such as 5 cm by 5 cm. The occupancy grid map 620 accumulates range data 515 having x and y coordinates from the range finding sensor(s) 510, 510a-d by receiving range points 515 in cells 624 occupying the corresponding x, y values of the range points 515. For example, a first cell occupying x=0-5 cm and y=0-5 cm receives a point 515 having an x value of 3 cm and a y value of 2 cm. Each cell 624 may have a classification. A cell 624f having a probability of occupancy less than 50%, for example, may be classified as unoccupied or free, whereas a cell 624o having an occupancy greater than or equal to 50%, in this example may be classified as occupied.

Referring to FIGS. 6-8B, the SLAM controller 610 may use a particle filter 630 (e.g., a Kalman filter or extended Kalman filter (EKF)) having a particle model 645 made up of a set of particles $640_{1-n}$ that represent hypotheses of a pose P of the robot 100 in its environment. Each particle $640_n$ builds its own associated map data. As a result, each particle $640_n$ may have an associated particle map 642, robot pose 644, and/or a particle weight 646. Each particle $640_n$ may represent a hypothesis, in terms of its associated map 642 and robot pose 644, of the location of the robot 100 with respect to its surroundings. The SLAM controller 610 may score and attribute a particle weight 646 to each particle $640_n$.

The pose P or location in space (i.e., x, y, and θ in Euclidean planar space) of a mobile robot usually changes in time, so data aggregation may involve referencing spatial measurements back to a common datum. In general, SLAM algorithms estimate a new pose P of the robot 100 based on the commanded motion and subsequent distance measurements from the robot 100 to the outside world (i.e., the scene 10). In order for the pose distribution (probabilistic estimate of the true location) to converge, the distance measurements should be relatively unique. For example, a single distance measurement in an empty square room may provide some information about the robot's location; however, a determined pose P based on so much ambiguity and estimation may do more harm than good for localizing the robot 100. Given the same situation, but having 10 different range measurements likely allows the robot 100 to determine if it is near a wall or a corner and even which particular wall or corner it is near.

The navigation system 600 may employ data aggregation, a technique used to construct a single dataset from groups of data collected across different sensor types (e.g., sonar, tactile, and/or proximity sensors) and/or at various times when acquired sensor data is sparse, which may result from sensors with low spatial resolution and/or slow update rates. In some implementations, the SLAM controller 610, with data aggregation enabled, aggregates sensor readings across sensors (e.g., four separate IR range finders 510a-d and a virtual range sensor based on a wall-follower infrared proximity sensor 530/wall follower behavior) and across time. For example, as the robot 100 moves forward, the range finders 510a-d capture range data (e.g., 30 points/meter). Unlike a rotating scanner that may obtain about 360 points per 360 degree revolution, the range finders 510a-d may capture relatively fewer points. As a result, rather than updating the map 620 after each sampling, the SLAM controller 610 updates the map 620 after a collection of samplings (i.e., a collection of points).

The SLAM controller 610 may update the map 620 on a periodic basis, such as after travelling a threshold distance (e.g., once every meter or half meter travelled by the robot 100), after a threshold period of time (e.g., once every 1-3 seconds), or after collecting a threshold number of points (e.g., greater than 20 points). To aggregate across time the SLAM controller 610 stores sensor measurements as range and bearing pairs originating from the center of the robot 100, along with a best estimate of the robot's pose P (x, y, and θ measurements of the robot's center to an arbitrarily oriented coordinate system established when the particular run began).

The SLAM controller 610 may accumulate range data 515 in a data buffer 612 (e.g., non-transitory memory) until it has acquired a predefined amount. During the accumulation period, the position or pose P of the robot 100 becomes less and less well-known, since the robot 100 continues to move, which adds uncertainty. Once the data buffer 612 is full or reaches a threshold capacity, the SLAM controller 610 processes the buffered range data 515 as a group and updates the map 620 and corrects the robot's position or pose P. The SLAM controller 610 may balance a cost in increased error when moving with a correction accuracy gain that results from accumulating more range data 515. In some implementations, the SLAM controller 610 processes the range data after collecting 100 points. This may correspond to approximately 4 feet or less of travel between updates, but could be more depending on the particular geometry of a given room and the maximum detection range of the sensor. The proper balance for any robot is a function of the quality of the odometry sensor(s) and range sensor(s), and the environments that it's expected to operate in.

In some implementations, the SLAM controller 610 forces processing of the accumulated data if the robot 100 travels beyond a certain distance or rotates through a certain number of degrees. The trigger for processing data may also be dynamically based on other measures of the system (e.g., a current confidence of the localization of the robot 100, a quality of the accumulated data, etc.). In some examples, the SLAM controller 610 keeps points that match the map 620 and drop any points that do not. The SLAM controller 610 may execute a matching routine that computes how well a given point matches the map (e.g., is within a threshold distance of a known point). If the range finders 510a-d fail to receive a reflection from an object, rather than assuming an object is not present, the SLAM controller 610 may ignore the corresponding range data (in lieu of other subsequently acquired data).

The navigation system 600 may include a localization quality estimator 650 for determining a confidence in the localization of the robot 100. Rather than assuming that all range data received by the robot 100 will be helpful in improving the robot's localization and the building of the map 620, which may be true when the available range data 515 is rich and generally accurate, the SLAM controller 610 may receive a confidence level of the robot localization from the localization quality estimator 650 before making any such determination. When the collected range data 515 is abundant, the robot 100 may be unlikely to become grossly delocalized. However, when the collected range data 515 is sparse, has very limited range, or becomes highly variable when the measured distance is greater than a threshold distance, such as about one meter for infrared ranging sensors, there may be periods of time when the navigation system 600 does not have a very high confidence in the pose P of the robot 100. The SLAM controller 610 may use the localization quality estimator 650 to assess the quality Q of the believed pose P of the robot 100.

In some implementations, the localization quality estimator 650 uses the particle weights 646 to estimate if the robot 100 has become delocalized by determining an average particle weight 646 for the particles 640 of the particle model 645 (or a subset thereof) to provide an estimate of localization quality Q. If the robot 100 is well-localized the average weight 646 is high, otherwise it is low. The localization quality estimator 650 may apply one or more filters to smooth out the determination. The localization quality estimator 650 may determine an instantaneous localization of the robot 100 (i.e., the localization quality according to the data available from the most recent range measurements 515) by processing the instantaneous localization through a fast low-pass filter 1010 and a slow low-pass filter 1020 and comparing the ratio of two low-pass filters 1010, 1020. The localization quality estimator 650 may then put the instantaneous localization results through a leaky integrator 1030, so as to estimate a stable localization. When the value of the integrator 1030 is above a predefined threshold the robot 100 is considered to be well localized.

The SLAM controller 610 may update particles 640n in the particle model 645 using a robot motion model 660. The robot motion model 660 models movement, including corresponding measurement error of the robot 100. Using odometry and/or an inertial measurement unit (IMU) 520, the robot motion model 660 measures motion (e.g., travel distance and/or travel path) of the robot 100. Due to drive wheel slip, encoder tolerances, etc., the measured odometry may include an error term. For example, if the robot 100 rotates 90° and translates one meter, the measured odometry may be off by +/−10° of rotation and +/−5 cm of translation. Moreover, the IMU 520 may have a different error, depending on it method of measurement (e.g., gyro). The robot motion model 660 may be a Gaussian error model centered on a travel vector derived from a travel vector derived from odometry and/or the IMU 520, where some portion of the Gaussian curve represents noise.

The SLAM controller 610 may receive an input of range data 515 estimating locations of features 14 of the environment 10 relative to the robot 100 (e.g., relative to the center C of the robot 100). The SLAM controller 610 receives distance estimates of obstacles 12 at a given height off of the floor 5 as dictated by the mounting position and orientation of the sensor (e.g., range finders 510).

From the individual pose 644 (position hypotheses) of the particles 640$_n$, the particle filter 630 may select the hypothesis of the particle 640$_n$ having the highest weight 646 as a best pose 644 or position hypothesis of the robot 100 at a current time. The robot controller 150 can use the pose 644 or position hypothesis of the selected particle 640$_n$ and its associated particle map 642 to determine a way point for issuing a drive command to the drive system 200. In other words, the robot controller 150 uses the particle map 642 of the selected particle 640$_n$ to navigate at that given moment in time. For example, if the robot 100 has a drive goal to drive from a first room to a second room, the navigation system 600 may take a snapshot of a selected particle 640$_n$ (i.e., position hypothesis and/or maps) at a time of drive command issuance, and perform localization temporarily of that particle's hypothesis and that particle's map 642.

The SLAM controller 610 may update the particles 640$_n$ in a probabilistic manner using the robot motion model 660. The robot motion model 660 provides a probability distribution of new positions to which the robot 100 may have moved (e.g., based on odometry and/or an IMU 520). For example, if the SLAM controller 610 estimates that the robot 100 moved forward one meter, but with some error in that movement, rather than updating all of the particles 640$_n$ by moving them all forward one meter, for each particle 640$_n$, the SLAM controller 610 generates a sample based on a position distribution of the robot motion model 660 centered on one meter of forward movement with a threshold variance (e.g., 10%). A first particle 640$_1$ may receive a sample of 0.9 meters of forward movement. A second particle 640$_2$ may receive a sample of 1.1 meters of forward movement. A third particle 640$_3$ may receive a sample of 1.05 meters of forward movement, and so on, such that each particle 640$_n$ receives its own sample based on the position distribution. The SLAM controller 610 can update each particle 640$_n$ for motion based on its received sample.

The SLAM controller 610 may build the map 620 only when the robot 100 is well localized (i.e., has a good confidence of its location). If the robot 100 is not well localized, the navigation system 600 may cause the controller 150 to issue a drive command to maneuver the robot 100 to a known object, such as in contact with a wall or corner, to localize the robot 100 with respect to that known object. Moreover, to improve localization, the navigation system 600 may execute path planning for a path within a field of view 512 of the range finders 510a-d or other sensors of the sensor system 500. If the robot 100 becomes lost, it may execute a behavior 300 that moves the robot 100 in a manner (e.g., spiral movement) that probabilistically will find an object 12, such as a wall. The robot 100 may execute the wall-following behavior 300b to not only follow the wall to re-localize, but also use the wall-following as a virtual proximity sensor when the robot 100 follows the wall at a fixed distance or senses contact with the wall using the bump sensor(s) 530.

When the SLAM controller 610 is confident that the robot pose P is well-known, it may use the range data 515 of the range finders 5100a-d to add occupancy probabilities to the occupancy grid map/model 620. However, if the SLAM controller 610 is not confident in the robot's localization, it may skip the step of modifying/updating the occupancy grid map/model 620. All other parts of the SLAM process may proceed as usual. This technique causes the map 620 to become frozen in the last known-good state and to remain that way until the robot 100 is able to regain a high-quality estimate of its position (pose P), at which time the SLAM controller 610 may resume adding occupancy data to the map 620.

In short, this technique helps prevent the system from destroying a perfectly good map 620 due to what would otherwise be a temporary loss of localization. If the map 620 becomes significantly corrupted it may be very difficult, if not impossible, to localize successfully.

The SLAM controller 610 may execute selective resampling. Resampling may occur after the SLAM controller 610 processes all of the motion and range data and computes a weight 646 for each particle 640n in the particle model 645. The particle weight 646 of a particle 640n is based on a degree of agreement between its corresponding particle map 642 and the range data collected from the range finding sensor(s) 510a-d. Resampling is an evolutionary process in which strongly weighted particles 640n are more likely to be selected into a new particle population or particle model 645 than weakly weighted particles 640n. In some examples, resampling occurs on each cycle of the SLAM algorithm.

When executing with sparse range data, the SLAM controller 610 may find it difficult to distinguish strong particles 640n from weak particles 640n in some cycles of the SLAM algorithm. At such times, the shape of the particle weight distribution may be relatively flat and resampling may be unhelpful. In some instances, resampling may be harmful in such a situation, because weak particles 640n have a greater chance of replicating than they should, and strong particles 640n have a lesser chance of replicating than they ought to. The solution to this problem is to resample only when there is adequate difference in the weighting of the particles 640n that make up the particle model 645. When there is not enough differentiation, the resampling step is skipped and the rest of the algorithm continues as usual.

If the SLAM controller 610 encounters a long period of time without resampling, as may occur if the model were to become significantly damaged, the SLAM controller 610 may replace large portions of the particle distribution with random particles 640n (or particles placed with intelligent bias based on some characteristic of the model or on certain sensor data).

Figure 9:
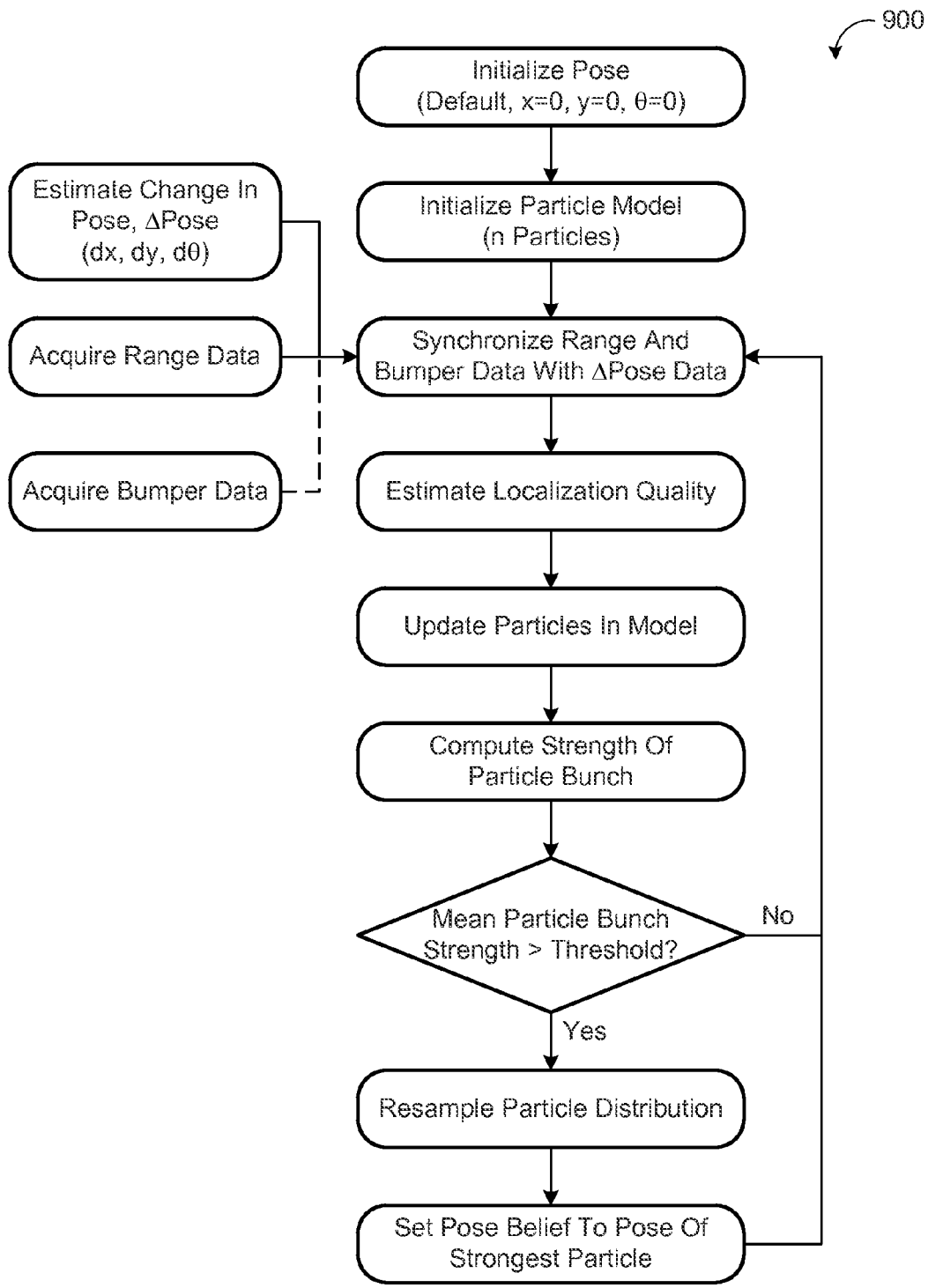
FIG. 9 provides an exemplary arrangement of operations for a method of simultaneous localization and mapping (SLAM).

FIGS. 9-12 illustrate an exemplary arrangement of operations for a method of simultaneous localization and mapping (SLAM). FIG. 9 provides an exemplary arrangement 900 of operations for a main routine of the method. The method includes initializing a robot pose P, such as x=0, y=0, and θ=0°, and initializing a particle model 645 having n particles 640. Associated with each particle 640n is a map 642, a pose 644, and a weight 646 (i.e., confidence rating). The method further includes estimating a change in the robot pose ΔPose (i.e., as dx, dy, dθ), for example, using wheel odometry 205 and/or gyroscopic data 525 (e.g., from the inertial measurement unit 520), acquiring range data 515 (e.g., form the range finding sensor(s) 510a-d), and optionally acquiring bumper data 535 (e.g., from the bumper sensor 530). The method includes synchronizing range data 515 and bumper data 535 with change(s) in the robot pose (i.e., ΔPose data), estimating a localization quality Q (e.g., using the localization quality estimator 650), and updating each particle 640n in the particle model 645. The method includes computing the strength or weight 646 of a particle bunch, for example, using a mean, fast low-pass filter, and/or a slow low-pass filter. If the mean strength 646 of the particle bunch is above a threshold strength 646, the method includes re-sampling the particle distribution 645, setting a pose belief P to that of the strongest particle pose 644, and returning to the step of synchronizing newly acquired range data 515 and bumper data 535 with newly acquired ΔPose data (e.g., odometry 205). If the mean strength 646 of the particle bunch 645 is below the threshold particle strength 646, the method includes returning to the step of synchronizing newly acquired range data 515 and bumper data 535 with newly acquired ΔPose data (e.g., odometry 205). As a result, the method may include resampling only when the SLAM Controller 610 can differentiate between strong and weak particles 640n.

Figure 10A:
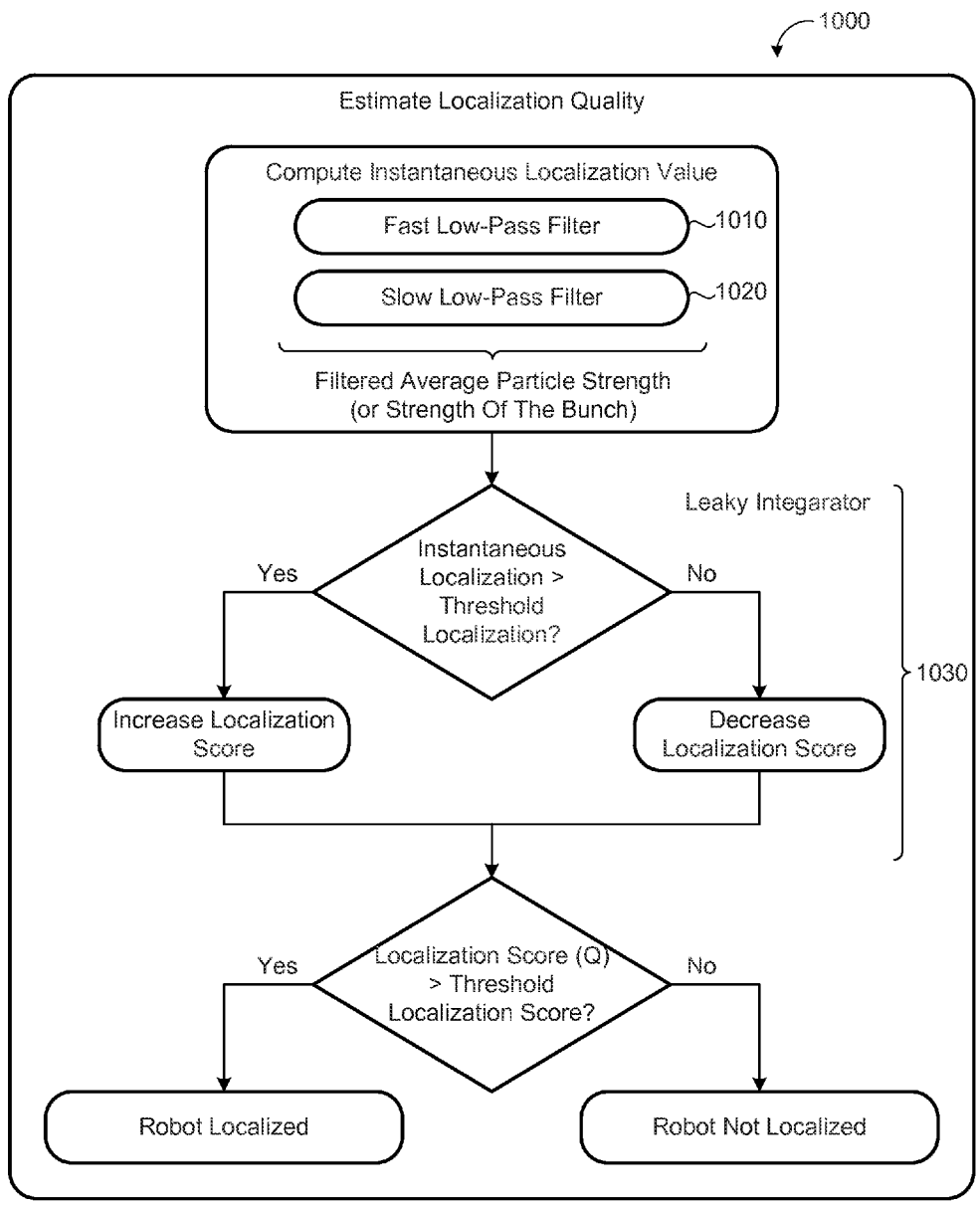
FIG. 10A provides an exemplary arrangement of operations for a method of determining a robot localization quality.

FIG. 10A provides an exemplary arrangement 1000 of operations for a method of determining a robot localization quality Q. The method includes computing an instantaneous localization value, which may be the value of the particle strength a passed through a fast low-pass filter and referenced to the strength as passed through a slower low-pass filter. If the instantaneous localization is above a threshold quantity, the method includes increasing a localization score (if the localization score is below a maximum value). Otherwise, the method includes decreasing a localization score (if the localization score is above a minimum value). If the localization score is above a threshold score, the robot 100 is considered localized.

Figure 10B:
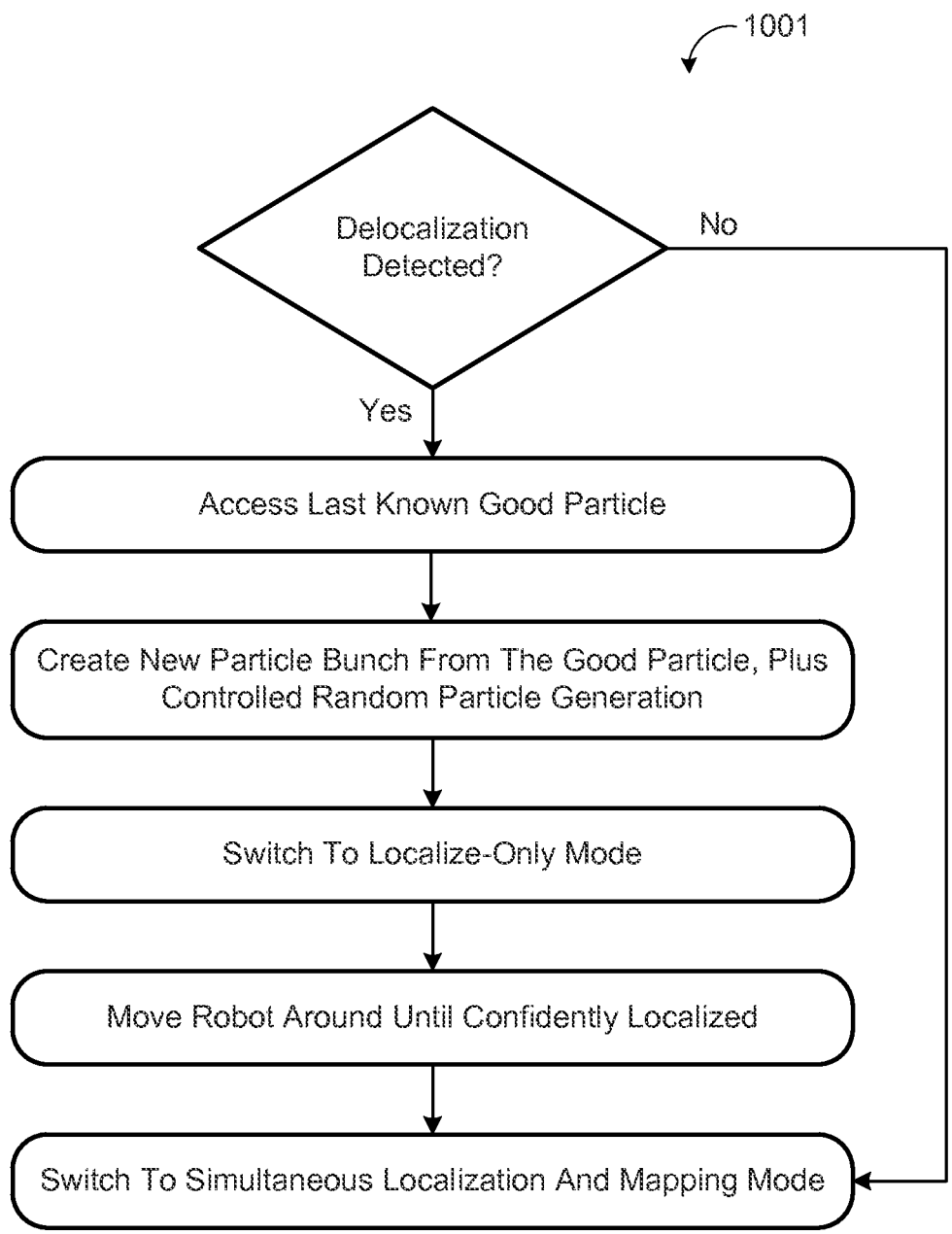
FIG. 10B provides an exemplary arrangement of operations for a method of determining a robot re-localization.

FIG. 10B provides an exemplary arrangement 1001 of operations for a method of robot re-localization. If the robot 100 determines it is delocalized (e.g., based on the robot localization quality Q), rather than degrading its map 620, the robot 100 may decide to use an old map 620 that the robot 100 knows is good and/or repopulate the particle model 645. In other words, rather than using bad information to update the map 620 (e.g., contributing to map drift) when the robot 100 becomes delocalized, the robot 100 may stop building the map 620 until it becomes re-localized again. In some implementations, the SLAM controller 610 may replace large portions of the particle distribution with clones of "good" particles 640 and/or random particles 640n. For example, the SLAM controller 610 may access a last know "good" particle 640 and create a new particle bunch from that "good" particle 640. The SLAM controller 610 may maintain a time-series buffer (e.g., record in non-transitory memory) of the best maps 620 and poses P of the robot 100 over a period of time. The SLAM controller 610 may copy or partially copy one or more "good" particles 640 corresponding to the buffered best maps 620 and poses P of the robot 100 to repopulate the particle model 645. Moreover, the SLAM controller 610 may add a number of randomly generated particles 640 and/or kill off any determined "bad" particles 640 as well. The robot 100 may switch to a localization-only mode and maneuver itself about until it becomes confidently localized. Once localized again, the robot 100 may switch back to a SLAM-mode.

In some implementations, when the robot 100 determines it is delocalized, the robot controller 150 executes the wall-following behavior 300b to follow a wall for re-localization. The robot 100 may use the wall-following as a virtual proximity sensor when the robot 100 follows the wall at a fixed distance or senses contact with the wall using the bump sensor(s) 530. Moreover, the SLAM controller 610 may add new particles 640 to the particle model 645 based on the virtual proximity sensor data, allowing the robot to not only re-localize off of the wall, but also add reliable particles 640 to the particle model 645.

Figure 11:
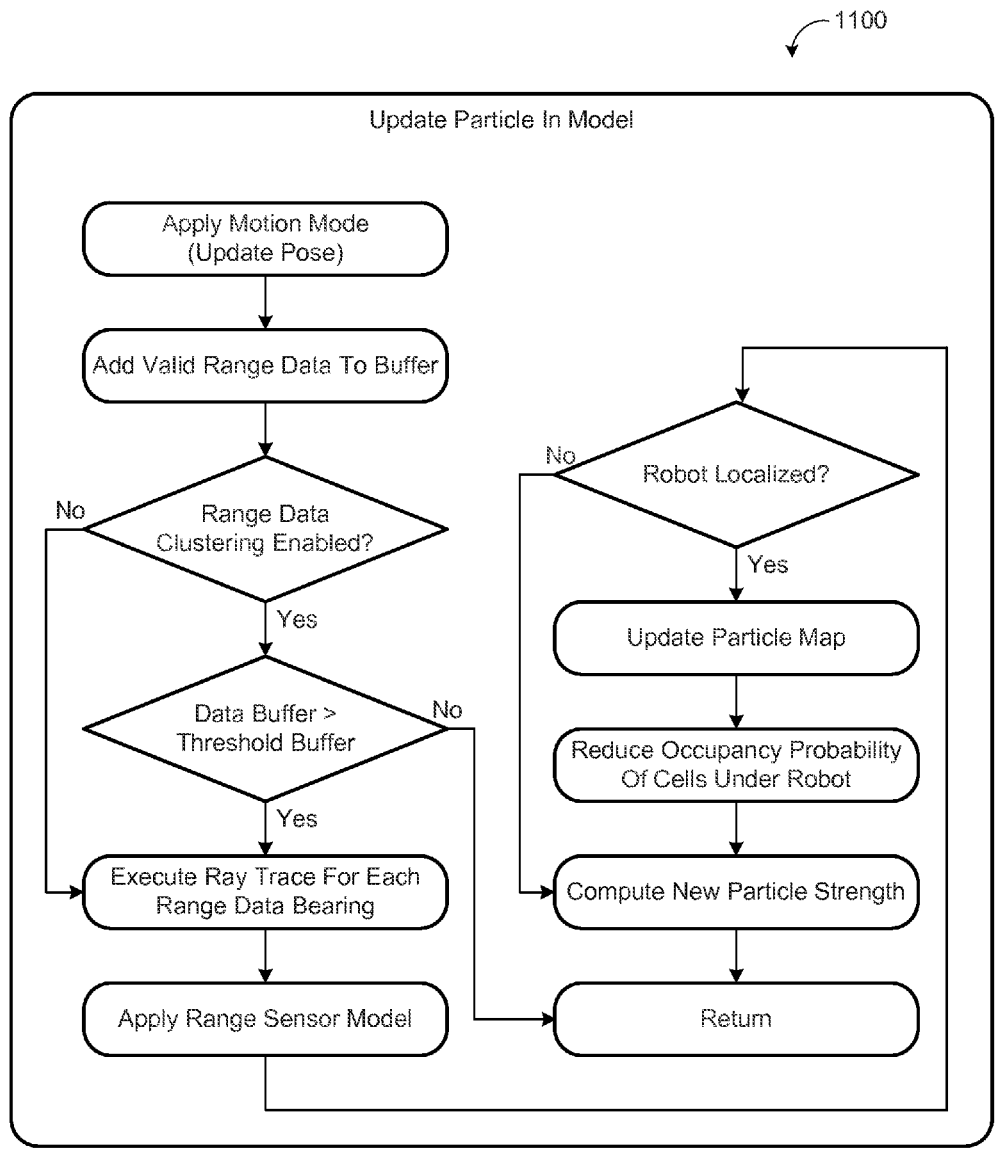
FIG. 11 provides an exemplary arrangement of operations for a method of updating a particle in a particle model.

FIG. 11 provides an exemplary arrangement 1100 of operations for a method of updating a particle 640n in the particle model 645. The method includes applying the robot motion model 660 for any change in robot pose (ΔPose=dx, dy, dθ). The robot motion model 660 may be represented as:

$$x = x + dx + GN*C1*dx + GN*C2*dy \quad (1)$$

$$y = y + dy + GN*C2*dy + GN*C4*dx \quad (2)$$

$$\theta = \theta + d\theta + GN*C5*d\theta + GN*C6*(dx+dy) \quad (3)$$

where GN=Gaussian noise.

The method further includes adding valid range data 515 to the data buffer 612, for example, using a current robot pose P as an origin. If the range data clustering is enabled, the method includes checking if a data buffer threshold has been met. If the data buffer threshold has not been met, then the method returns (e.g., to the main SLAM method). If the range data clustering is disabled or the data buffer threshold has been met, the method includes executing a ray trace for each range data bearing. An exemplary input for the ray trace may include a robot bearing and/or a map 620, 642, and an exemplary output may include a predicted range for a given bearing. The method further includes applying a range sensor model 670 (FIG. 7). An exemplary input for the range sensor model 670 may include a measured range and the predicted range, and an exemplary output may include a probability of occupancy of each cell along the ray trace. The method includes determining if a localization of the robot 100 is above a threshold quality Q based on a received robot state. If the robot 100 is well localized, the method includes updating a particle map 642 with the output of the range sensor model 670, reducing the occupancy probability of cells 624 of the map 620 underneath the robot 100, and computing a new particle strength/weight 646. If the robot 100 is not well localized, the method proceeds to computing the new particle strength/weight 646. The particle strength/weight 646 can be based on a number of measured ranges that match the expected ranges, based on the particle map 642. Afterwards, the method returns (e.g., to the main SLAM method).

Figure 12:
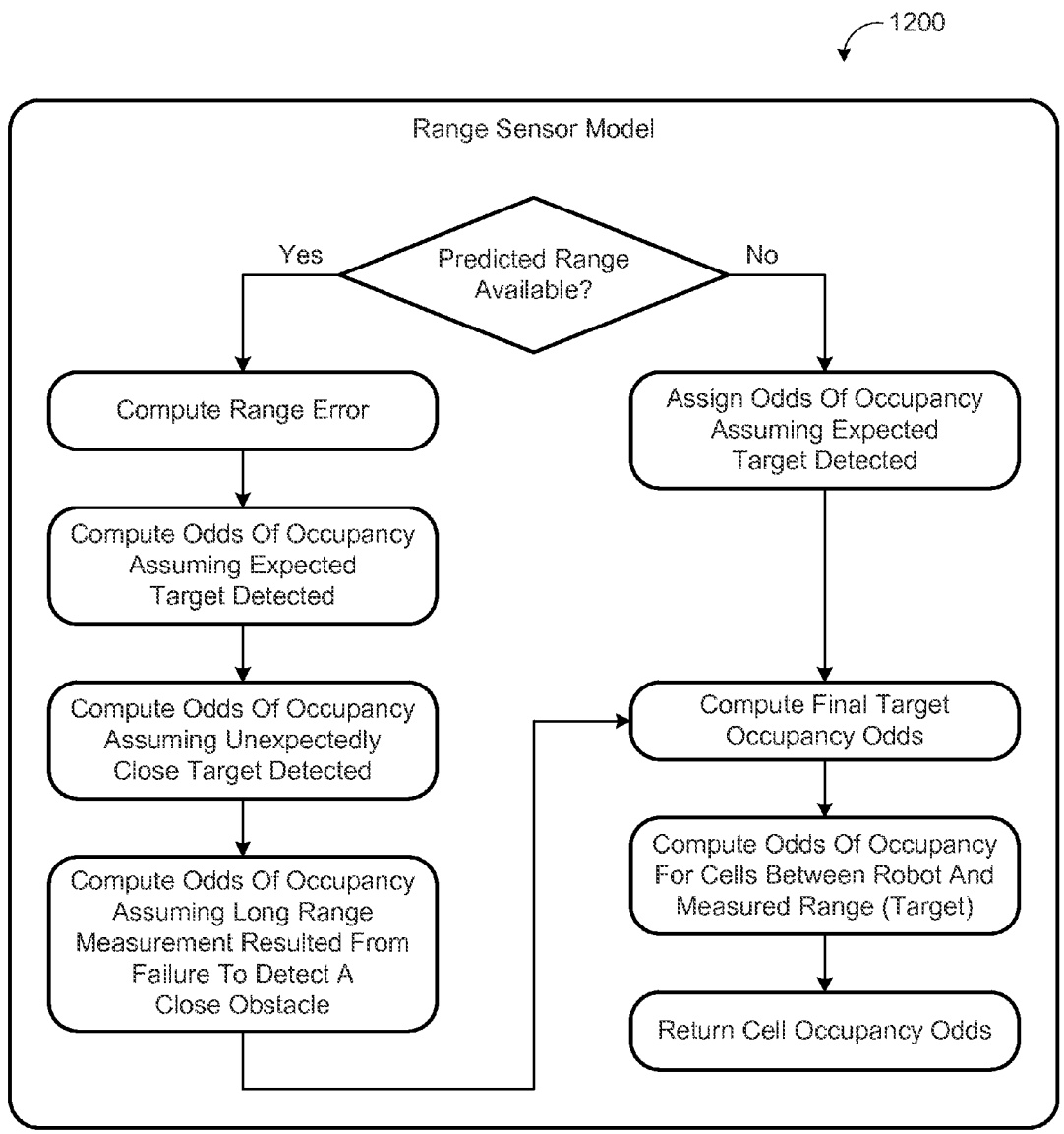
FIG. 12 provides an exemplary arrangement of operations for a method of applying a range sensor model.

FIG. 12 provides an exemplary arrangement 1200 of operations for a method of applying the range sensor model 670. The method includes determining if a predicted range is available. This may entail determining if a map value exists at a ranged location. If a predicted range is available, the method includes determining a range error, where Range Error=abs(Measured Range−Predicted Range) (4)

and determining a first probability of occupancy assuming an expected target is detected by the robot 100. This may entail assigning one of five range values (e.g., close, somewhat close, medium, somewhat far, and far) based on a magnitude of range error. The method further includes determining a second probability of occupancy assuming an expectedly close target is detected by the robot 100. This may entail assigning one of three range values (e.g., close, medium, and far) based on a range difference.

Range Difference=abs(Measured Range−Actual Range)−abs(Predicted Range−Actual Range) (5)

The assigned range value can be based on how much closer the measured range was to the target object than the predicted range. The method further includes determining a third probability of occupancy assuming that a long range measurement results from a failure to detect a close object. This may entail assigning a predetermined value.

If a predicted range is not available, the method includes determining a fourth probability of occupancy an expected target object was detected. This may entail assigning one of three range values (e.g., close, medium, and far) based on a magnitude of the measured range.

The method includes determining a fifth probability of occupancy of a final target object, which can be a weighted average of each of the determined probabilities of occupancy (e.g., of the first, second and third probabilities of occupancy or of the fourth probability of occupancy). The method also includes determining a sixth probability of occupancy for cells between the robot and the measured range to the target object. This may entail assigning values based on how close cells are to the robot. The sixth probability of occupancy (also referred to as the cell probability of occupancy) is returned.

Figure 13:
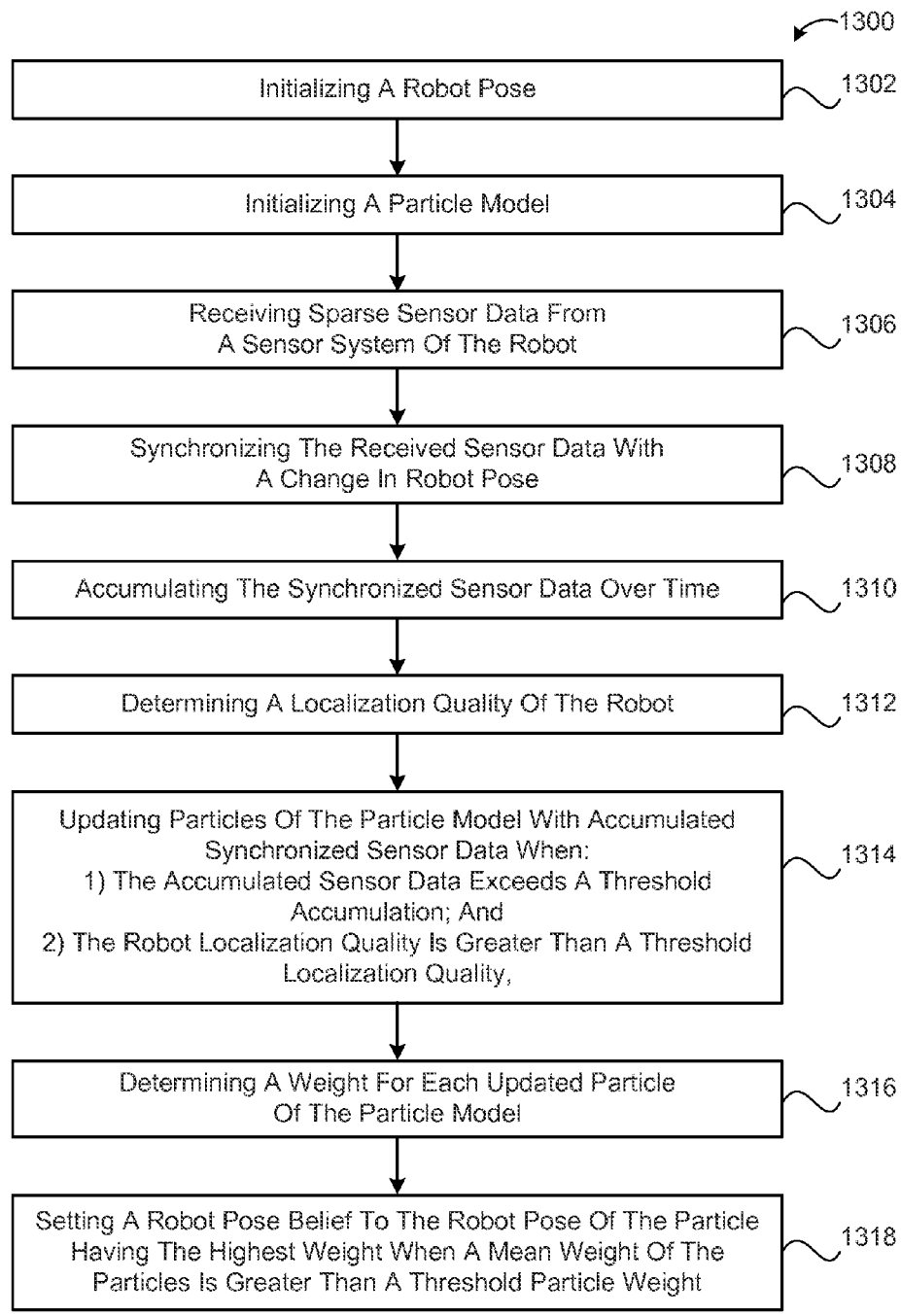
FIG. 13 provides an exemplary arrangement of operations for a method of simultaneous localization and mapping executed on a controller of a mobile robot.

FIG. 13 provides an exemplary arrangement 1300 of operations for a method of simultaneous localization and mapping executed on the SLAM controller 610 of the robot 100. The method includes initializing 1302 the robot pose P and initializing 1304 the particle model 645 of the particle filter 630 executing on the SLAM controller 610. The particle model 645 includes particles 640n, each having an associated map 642, robot pose 644, and weight 646. The method also includes receiving 1306 sparse sensor data 205, 515 (e.g., odometry 205, range data 515, inertial data 525, and/or bump data 535) from the sensor system 500 of the robot 100, synchronizing 1308 the received sensor data 205, 515, 525, 535 with a change in robot pose ΔP, accumulating 1310 the synchronized sensor data 205, 515, 525, 535 over time in non-transitory memory 612 (buffer), and determining 1312 a localization quality Q of the robot 100. When the accumulated sensor data 205, 515, 525, 535 exceeds a threshold accumulation and the robot localization quality Q is greater than a threshold localization quality, the method includes updating 1314 particles 640n of the particle model 645 with accumulated synchronized sensor data 205, 515, 525, 535. The method includes determining 1316 a weight 646 for each updated particle 640n of the particle model 645 and setting 1318 a robot pose belief P to the robot pose 644 of the particle 640n having the highest weight 646 when a mean weight 646 of the particles 640 is greater than a threshold particle weight 646.

In some implementations, the method includes sampling the particle model 645 for a particle population 640n and resampling the particle model 645 for the particle population when the robot localization quality Q is greater than the threshold localization quality Q. The method may include replacing a portion of the particle population 640n with randomly selected particles 640n of the particle model 645 when resampling fails to occur within a threshold sampling time period. Additionally or alternatively, the method may include replacing a portion of the particle population 640n with particles 640n selected from the particle model 645 based on the accumulated synchronized sensor data 205, 515, 525, 535 when resampling fails to occur within the threshold sampling time period.

The method may include determining the change in robot pose ΔP using odometry 205 received from a drive system 200 of the robot 100 and inertial measurements 525 from an inertial measurement unit 520 of the robot 100. In some examples, determining the robot localization quality Q includes computing an instantaneous localization (x, y, θ), receiving the instantaneous localization (x, y, θ) through a fast low-pass filter 1010, receiving the instantaneous localization (x, y, θ) through a slow low-pass filter 1020, and receiving the instantaneous localization (x, y, θ) through a leaky integrator 1030. The method may include comparing a ratio of results of the two low-pass filters 1010, 1020 integrated by the integrator 1030. When a result of the integrator 1030 is above a threshold value, the method may include determining the robot 100 as well localized (e.g., by assigning a localization quality Q accordingly).

The sensor data 205, 515, 525, 535 may include range data 515 (e.g., from one or more infrared range finding sensors) and the synchronized sensor data 205, 515, 525, 535 include range measurement and bearing pairs. The bearings may be determined from the known mount locations of the sensors 510a-d.

In some implementations, the method includes updating the map 642, the pose 644, and the weight 646 of each particle 640n. Updating the particle pose 644 may include applying a robot motion model 660. The robot motion model 660 models movement of the robot 100 based on odometry 205 and inertial measurements 525. Updating the particle map 642 may include executing a ray trace of the accumulated synchronized sensor data 205, 515, 525, 535 and applying a range sensor model 670 to the accumulated synchronized sensor data 205, 515, 525, 535. Updating the particle weight 646 may be based on a number of measured ranges 515 of the accumulated synchronized sensor data 205, 515, 525, 535 matching predicted ranges 515.

Executing the ray trace may include, for each range measurement and bearing pair, receiving the bearing 205 and an existing particle map 642, and computing a predicted range 515. The method may further include receiving a measured range 515, receiving the predicted range 515, and computing a probability of occupancy of an object 12 in each cell 622 of the particle map 642 along the ray trace. In some examples, applying the range sensor model 670 includes only updating particle map cells 624 corresponding to the synchronized sensor data 205, 515, 525, 535.

In some implementations, applying the range sensor model 670 includes computing a range error as an absolute difference between the measured range 515 and the predicted range 515 and computing the occupancy probability within each cell 624 of the particle map 642 along the ray trace based on the range error. For each particle map cell 624 along the ray trace, the method may include computing a first occupancy probability assuming detection of an expected object 12, computing a second occupancy probability assuming detection of an expectedly close object 12, computing a third occupancy probability assuming failure to detect of an expected close object 12 within a threshold distance of the robot 100, and computing a weighted average of the first, second, and third occupancy probabilities.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Moreover, subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The terms "data processing apparatus", "computing device" and "computing processor" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as an application, program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

One or more aspects of the disclosure can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims. For example, the actions recited in the claims can be performed in a different order and still achieve desirable results.

What is claimed is:

1. A method of simultaneous localization and mapping executed on a controller of an autonomous mobile robot, the method comprising:
   initializing a robot pose;
   initializing a particle model of a particle filter executing on the controller, the particle model having particles, each particle having an associated particle map, robot pose, and weight, the particle map having cells;
   receiving sparse sensor data from a sensor system of the robot;
   synchronizing the received sensor data with a change in robot pose;
   accumulating the synchronized sensor data over time in non-transitory memory;
   determining a localization quality of the robot;
   when the accumulated sensor data exceeds a threshold accumulation and the robot localization quality is greater than a threshold localization quality, updating each particle of the particle model with the accumulated synchronized sensor data by:
      computing a range error as an absolute difference between a measured range of the accumulated sensor data and a predicted range; and
      computing a probability of occupancy of an object in each cell of the associated particle map along a ray trace of the accumulated synchronized sensor data based on the range error by:
         computing a first occupancy probability assuming detection of an expected object;
         computing a second occupancy probability assuming detection of an expected close object of the robot;
         computing a third occupancy probability assuming a failure to detect an expected close object within a threshold distance of the robot; and
         computing a weighted average of the first, second, and third occupancy probabilities;
   determining a weight for each updated particle of the particle model; and
   setting a robot pose belief to the robot pose of the particle having the highest weight when a mean weight of the particles is greater than a threshold particle weight.

2. The method of claim 1, further comprising sampling the particle model for a particle population.

3. The method of claim 2, further comprising resampling the particle model for the particle population when the robot localization quality is greater than the threshold localization quality.

4. The method of claim 3, further comprising replacing a portion of the particle population with randomly selected particles of the particle model when resampling fails to occur within a threshold sampling time period.

5. The method of claim 3, further comprising replacing a portion of the particle population with particles selected from the particle model based on the accumulated synchronized sensor data when resampling fails to occur within a threshold sampling time period.

6. The method of claim 1, further comprising determining the change in robot pose using odometry received from a drive system of the robot and inertial measurements from an inertial measurement unit of the robot.

7. The method of claim 1, wherein the sensor data comprises range data and the synchronized sensor data comprises range measurement and bearing pairs.

8. The method of claim 7, wherein updating particles comprises, for each particle:
  updating its particle pose by applying a robot motion model to the accumulated synchronized sensor data, the robot motion model modeling movement of the robot based on odometry and inertial measurements;
  updating its particle map by:
    executing the ray trace of the accumulated synchronized sensor data; and
    applying a range sensor model to the accumulated synchronized sensor data; and
  updating its particle weight based on a number of measured ranges of the accumulated synchronized sensor data matching predicted ranges.

9. The method of claim 8, wherein executing the ray trace comprises, for each range measurement and bearing pair:
  receiving the bearing and an existing particle map; and
  computing the predicted range.

10. The method of claim 9, wherein applying the range sensor model comprises:
  receiving the measured range; and
  receiving the predicted range.

11. The method of claim 10, wherein applying the range sensor model further comprises only updating particle map cells corresponding to the synchronized sensor data.

12. A method of simultaneous localization and mapping executed on a controller of an autonomous mobile robot, the method comprising:
  initializing a robot pose;
  initializing a particle model of a particle filter executing on the controller, the particle model having particles, each particle having an associated map, robot pose, and weight;
  receiving sparse sensor data from a sensor system of the robot;
  synchronizing the received sensor data with a change in robot pose;
  accumulating the synchronized sensor data over time in non-transitory memory;
  determining a localization quality of the robot comprising:
    computing an instantaneous localization;
    receiving the instantaneous localization through a fast low-pass filter;
    receiving the instantaneous localization through a slow low-pass filter; and
    receiving the instantaneous localization through a leaky integrator; and
  when the accumulated sensor data exceeds a threshold accumulation and the robot localization quality is greater than a threshold localization quality, updating particles of the particle model with accumulated synchronized sensor data;
  determining a weight for each updated particle of the particle model; and
  setting a robot pose belief to the robot pose of the particle having the highest weight when a mean weight of the particles is greater than a threshold particle weight.

13. An autonomous mobile robot comprising:
  a drive system configured to maneuver the robot over a floor surface;
  a sensor system comprising at least one infrared range finding sensor producing range data of a scene about the robot;
  a controller in communication with the drive system and the sensor system, the controller executing a simultaneous localization and mapping routine comprising:
    initializing a robot pose;
    initializing a particle model of a particle filter executing on the controller, the particle model having particles, each particle having an associatedab ide map, robot pose, and weight, the particle map having cells;
    receiving sparse sensor data from a sensor system;
    synchronizing the received sensor data with a change in robot pose;
    accumulating the synchronized sensor data over time in non-transitory memory;
    determining a localization quality of the robot;
    when the accumulated sensor data exceeds a threshold accumulation and the robot localization quality is greater than a threshold localization quality, updating each particle of the particle model with the accumulated synchronized sensor data by:
      computing a range error as an absolute difference between a measured range of the accumulated sensor data and a predicted range; and
      computing a probability of occupancy of an object in each cell of the associated particle map along a ray trace of the accumulated synchronized sensor data based on the range error by:
        computing a first occupancy probability assuming detection of an expected object;
        computing a second occupancy probability assuming detection of an expected close object of the robot;
        computing a third occupancy probability assuming failure to detect an expected close object within a threshold distance of the robot; and
        computing a weighted average of the first, second, and third occupancy probabilities;
    determining a weight for each updated particle of the particle model; and
    setting a robot pose belief to the robot pose of the particle having the highest weight when a mean weight of the particles is greater than a threshold particle weight.

14. The robot of claim 13, wherein the simultaneous localization and mapping routine further comprises sampling the particle model for a particle population.

15. The robot of claim 14, wherein the simultaneous localization and mapping routine further comprises resampling the particle model for the particle population when the robot localization quality is greater than the threshold localization quality.

16. The robot of claim 15, wherein the simultaneous localization and mapping routine further comprises replacing a portion of the particle population with randomly selected particles of the particle model when resampling fails to occur within a threshold sampling time period.

17. The robot of claim 15, wherein the simultaneous localization and mapping routine further comprises replacing a portion of the particle population with particles selected from the particle model based on the accumulated synchronized sensor data, when resampling fails to occur within a threshold sampling time period.

18. The robot of claim 13, further comprising an inertial measurement unit, the simultaneous localization and mapping routine further comprises determining the change in robot pose using odometry received from the drive system and inertial measurements from the inertial measurement unit.

19. The robot of claim 13, wherein the sensor data comprises range data from the at least one range finding sensor and the synchronized sensor data comprises range measurement and bearing pairs.

20. The robot of claim 19, wherein updating particles comprises, for each particle:
 updating its particle pose by applying a robot motion model to the accumulated synchronized sensor data, the robot motion model modeling movement of the robot based on odometry and inertial measurements;
 updating its particle map by:
  executing the ray trace of the accumulated synchronized sensor data; and
  applying a range sensor model to the accumulated synchronized sensor data; and
 updating its particle weight based on a number of measured ranges of the accumulated synchronized sensor data matching predicted ranges.

21. The robot of claim 20, wherein executing the ray trace comprises, for each range measurement and bearing pair:
 receiving the bearing and an existing particle map; and
 computing the predicted range.

22. The robot of claim 21, wherein applying the range sensor model comprises:
 receiving the measured range; and
 receiving the predicted range.

23. The robot of claim 22, wherein applying the range sensor model further comprises only updating particle map cells corresponding to the synchronized sensor data.

24. The robot of claim 13, wherein the sensor system comprises:
 a first infrared range finding sensor arranged to aim along a forward drive direction of the robot;
 a second infrared range finding sensor arranged to aim about 90 degrees to the right of the forward drive direction of the robot;
 a third infrared range finding sensor arranged to aim about 90 degrees to the left of the forward drive direction of the robot; and
 a fourth infrared range finding sensor arranged to aim rearward, opposite of the forward drive direction of the robot;
 wherein the sensor data received by the simultaneous localization and mapping routine comprises range data from the infrared range finding sensors.

25. The robot of claim 24, wherein the sensor system further comprises at least one bump sensor, the sensor data received by the simultaneous localization and mapping routine comprising bump data from the at least one bump sensor.

26. An autonomous mobile robot comprising:
 a drive system configured to maneuver the robot over a floor surface;
 a sensor system comprising at least one infrared range finding sensor producing range data of a scene about the robot;
 a controller in communication with the drive system and the sensor system, the controller executing a simultaneous localization and mapping routine comprising:
  initializing a robot pose;
  initializing a particle model of a particle filter executing on the controller, the particle model having particles, each particle having an associated map, robot pose, and weight;
  receiving sparse sensor data from a sensor system;
  synchronizing the received sensor data with a change in robot pose;
  accumulating the synchronized sensor data over time in non-transitory memory;
  determining a localization quality of the robot comprising:
   computing an instantaneous localization;
   receiving the instantaneous localization through a fast low-pass filter;
   receiving the instantaneous localization through a slow low-pass filter; and
   receiving the instantaneous localization through a leaky integrator; and
  when the accumulated sensor data exceeds a threshold accumulation and the robot localization quality is greater than a threshold localization quality, updating particles of the particle model with accumulated synchronized sensor data;
  determining a weight for each updated particle of the particle model; and
  setting a robot pose belief to the robot pose of the particle having the highest weight when a mean weight of the particles is greater than a threshold particle weight.

27. A computer program product encoded on a non-transitory computer readable storage medium comprising instructions that when executed by a data processing apparatus cause the data processing apparatus to perform operations of a method comprising:
 initializing a robot pose of a mobile robot;
 initializing a particle model of a particle filter executing on the data processing apparatus, the particle model having particles, each particle having an associated particle map, robot pose, and weight, the particle map having cells;
 receiving sparse sensor data from a sensor system of the robot;
 synchronizing the received sensor data with a change in robot pose;
 accumulating the synchronized sensor data over time in non-transitory memory;
 determining a localization quality of the robot;
 when the accumulated sensor data exceeds a threshold accumulation and the robot localization quality is greater than a threshold localization quality, updating each particle of the particle model with the accumulated synchronized sensor data by:
  computing a range error as an absolute difference between a measured range of the accumulated sensor data and a predicted range; and
  computing a probability of occupancy of an object in each cell of the associated particle map along a ray trace of the accumulated synchronized sensor data based on the range error by:
   computing a first occupancy probability assuming detection of an expected object;
   computing a second occupancy probability assuming detection of an expected close object of the robot;

computing a third occupancy probability assuming failure to detect an expected close object within a threshold distance of the robot; and
computing a weighted average of the first, second, and third occupancy probabilities;
determining a weight for each updated particle of the particle model; and
setting a robot pose belief to the robot pose of the particle having the highest weight when a mean weight of the particles is greater than a threshold particle weight.

28. The computer program product of claim 27, wherein the method further comprises sampling the particle model for a particle population.

29. The computer program product of claim 28, wherein the method further comprises resampling the particle model for the particle population when the robot localization quality is greater than the threshold localization quality.

30. The computer program product of claim 29, wherein the method further comprises replacing a portion of the particle population with randomly selected particles of the particle model when resampling fails to occur within a threshold sampling time period.

31. The computer program product of claim 29, wherein the method further comprises replacing a portion of the particle population with particles selected from the particle model based on the accumulated synchronized sensor data when resampling fails to occur within a threshold sampling time period.

32. The computer program product of claim 27, wherein the method further comprises determining the change in robot pose using odometry received from a drive system of the robot and inertial measurements from an inertial measurement unit of the robot.

33. The computer program product of claim 27, wherein the sensor data comprises range data and the synchronized sensor data comprises range measurement and bearing pairs.

34. The computer program product of claim 33, wherein updating particles comprises, for each particle:
updating its particle pose by applying a robot motion model to the accumulated synchronized sensor data, the robot motion model modeling movement of the robot based on odometry and inertial measurements;
updating its particle map by:
executing the ray trace of the accumulated synchronized sensor data; and
applying a range sensor model to the accumulated synchronized sensor data; and
updating its particle weight based on a number of measured ranges of the accumulated synchronized sensor data matching predicted ranges.

35. The computer program product of claim 24, wherein executing the ray trace comprises, for each range measurement and bearing pair:
receiving the bearing and an existing particle map; and
computing the predicted range.

36. The computer program product of claim 35, wherein applying the range sensor model comprises:
receiving the measured range; and
receiving the predicted range.

37. The computer program product of claim 36, wherein applying the range sensor model further comprises only updating particle map cells corresponding to the synchronized sensor data.

38. A computer program product encoded on a non-transitory computer readable storage medium comprising instructions that when executed by a data processing apparatus cause the data processing apparatus to perform operations of a method comprising:
initializing a robot pose of a mobile robot;
initializing a particle model of a particle filter executing on the data processing apparatus, the particle model having particles, each particle having an associated map, robot pose, and weight;
receiving sparse sensor data from a sensor system of the robot;
synchronizing the received sensor data with a change in robot pose;
accumulating the synchronized sensor data over time in non-transitory memory;
determining a localization quality of the robot comprising:
computing an instantaneous localization;
receiving the instantaneous localization through a fast low-pass filter;
receiving the instantaneous localization through a slow low-pass filter; and
receiving the instantaneous localization through a leaky integrator; and
when the accumulated sensor data exceeds a threshold accumulation and the robot localization quality is greater than a threshold localization quality, updating particles of the particle model with accumulated synchronized sensor data;
determining a weight for each updated particle of the particle model; and
setting a robot pose belief to the robot pose of the particle having the highest weight when a mean weight of the particles is greater than a threshold particle weight.

39. A method executed on a controller of an autonomous mobile robot, the method comprising:
initializing a robot pose;
initializing a particle model;
receiving sparse sensor data from a sensor system of the robot;
synchronizing the received sensor data with a change in robot pose;
accumulating the synchronized sensor data over time in non-transitory memory;
determining a localization quality of the robot;
when the localization quality is below a threshold quality:
accessing a good particle from a particle model of a particle filter executing on the controller, the particle model having particles, each particle having an associated particle map, robot pose, and weight, the particle map having cells, wherein the good particle has weight greater than a threshold weight;
generating new particles based on the last known good particle; and
re-populating at least a portion of the particle model with the new particles;
when the accumulated sensor data exceeds a threshold accumulation and the robot localization quality is greater than a threshold localization quality, updating each particle of the particle model with the accumulated synchronized sensor data by:
computing a range error as an absolute difference between a measured range of the accumulated sensor data and a predicted range; and
computing a probability of occupancy of an object in each cell of the associated particle map along a ray trace of the accumulated synchronized sensor data based on the range error by:

computing a first occupancy probability assuming detection of an expected object;

computing a second occupancy probability assuming detection of an expected close object of the robot;

computing a third occupancy probability assuming failure to detect an expected close object within a threshold distance of the robot; and computing a weighted average of the first, second, and third occupancy probabilities;

determining a weight for each updated particle of the particle model; and setting a robot pose belief to the robot pose of the particle having the highest weight when a mean weight of the particles is greater than a threshold particle weight.

40. The method of claim 39, wherein accessing a good particle comprises accessing a last known good particle.

41. The method of claim 39, further comprising ceasing map building when the localization quality is below the threshold quality.

42. The method of claim 39, further comprising sampling the particle model for a particle population.

43. The method of claim 42, further comprising resampling the particle model for the particle population when the robot localization quality is greater than the threshold localization quality.

44. The method of claim 43, further comprising replacing a portion of the particle population with randomly selected particles of the particle model when resampling fails to occur within a threshold sampling time period.

45. The method of claim 43, further comprising replacing a portion of the particle population with particles selected from the particle model based on the accumulated synchronized sensor data when resampling fails to occur within a threshold sampling time period.

46. The method of claim 39, wherein the sensor data comprises range data and the synchronized sensor data comprises range measurement and bearing pairs, and wherein updating particles comprises, for each particle:

updating its particle pose by applying a robot motion model to the accumulated synchronized sensor data, the robot motion model modeling movement of the robot based on odometry and inertial measurements;

updating its particle map by:
 executing the ray trace of the accumulated synchronized sensor data; and
 applying a range sensor model to the accumulated synchronized sensor data; and updating its particle weight based on a number of measured ranges of the accumulated synchronized sensor data matching predicted ranges.

47. A method executed on a controller of an autonomous mobile robot, the method comprising:

determining a localization quality of the robot comprising:
 computing an instantaneous localization;
 receiving the instantaneous localization through a fast low-pass filter;
 receiving the instantaneous localization through a slow low-pass filter; and receiving the instantaneous localization through a leaky integrator; and when the localization quality is below a threshold quality:
 accessing a good particle from a particle model of a particle filter executing on the controller, the particle model having particles, each particle having an associated map, robot pose, and weight, wherein the good particle has weight greater than a threshold weight; and
 generating new particles based on the last known good particle; and
 re-populating at least a portion of the particle model with the new particles.

* * * * *

UNITED STATES PATENT AND TRADEMARK OFFICE
CERTIFICATE OF CORRECTION

| | | |
|---|---|---|
| PATENT NO. | : 9,020,637 B2 | Page 1 of 1 |
| APPLICATION NO. | : 13/790643 | |
| DATED | : April 28, 2015 | |
| INVENTOR(S) | : Mark Schnittman | |

It is certified that error appears in the above-identified patent and that said Letters Patent is hereby corrected as shown below:

In the Claims

At column 24, claim 13, line 18, should read "each particle having an associated particle map".

Signed and Sealed this
Eighth Day of September, 2015

Michelle K. Lee
*Director of the United States Patent and Trademark Office*